United States Patent
Inagaki et al.

(10) Patent No.: US 6,748,176 B1
(45) Date of Patent: Jun. 8, 2004

(54) OPTICAL DROPPING APPARATUS AND OPTICAL ADD/DROP MULTIPLEXER

(75) Inventors: Shinya Inagaki, Kawasaki (JP); Keiko Takeda, Kawasaki (JP); Kaoru Moriya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 557 days.

(21) Appl. No.: 09/645,881

(22) Filed: Aug. 25, 2000

(30) Foreign Application Priority Data

Sep. 1, 1999 (JP) ............................................ 11-247105

(51) Int. Cl.7 ........................... H04J 14/02; H04B 10/00
(52) U.S. Cl. ............................. 398/85; 398/83; 398/92; 398/95; 398/157; 398/159; 398/81
(58) Field of Search ............................. 359/124, 127, 359/130, 134, 138; 398/81, 83, 85, 87, 92, 95, 157, 159

(56) References Cited

U.S. PATENT DOCUMENTS

| 4,642,582 | A | * | 2/1987 | O'Meara | 332/7.51 |
|---|---|---|---|---|---|
| 5,243,610 | A | * | 9/1993 | Murata | 372/21 |
| 5,841,557 | A | * | 11/1998 | Otsuka et al. | 359/122 |
| 5,880,866 | A | * | 3/1999 | Stolen | 359/138 |
| 6,101,024 | A | * | 8/2000 | Islam et al. | 359/334 |
| 6,169,837 | B1 | * | 1/2001 | Kato et al. | 385/127 |
| 6,208,441 | B1 | * | 3/2001 | Jones et al. | 359/127 |
| 6,215,583 | B1 | * | 4/2001 | Lagerstrom et al. | 359/341 |
| 6,335,810 | B1 | * | 1/2002 | Uehara | 359/127 |

OTHER PUBLICATIONS

Patent Abstracts of Japan of JP 09033967 dated Feb. 7, 1997.
Patent Abstracts of Japan of JP 10013356 dated Jan. 16, 1998.
Patent Abstracts of Japan of JP 11055184 dated Feb. 26, 1999.

* cited by examiner

Primary Examiner—M. R. Sedighian
(74) Attorney, Agent, or Firm—Staas & Halsey LLP

(57) ABSTRACT

An optical dropping apparatus and an optical add/drop multiplexer capable of dropping optical signals of an arbitrary wavelength from a WDM optical signal. The apparatus comprises a generating means for occurring four-wave mixing, a dropping means for dropping light of a predetermined wavelength, and a controlling means for controlling the wavelength of a pump light which is occurred four-wave mixing at the generating means. This apparatus is able to change the wavelength of the optical signals to be dropped, by changing the wavelength of the pump light.

20 Claims, 13 Drawing Sheets

FIG. 2
A.
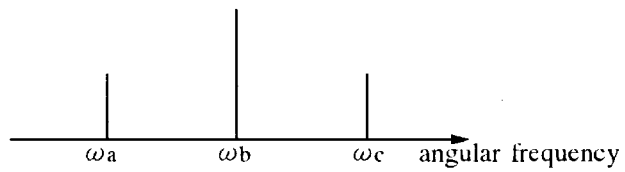
B.
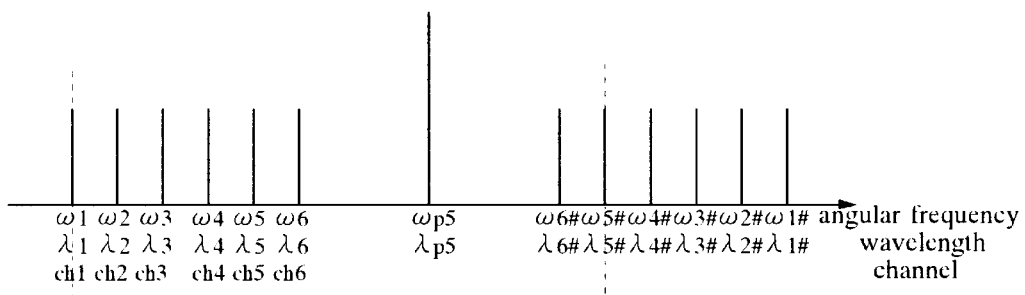
C.
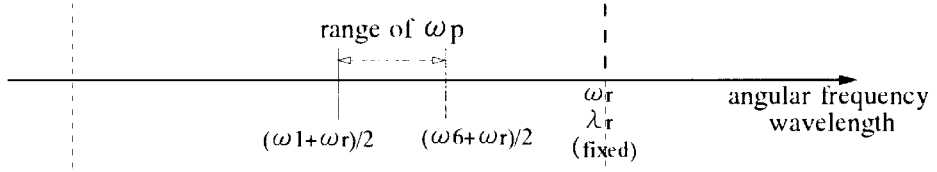
D.
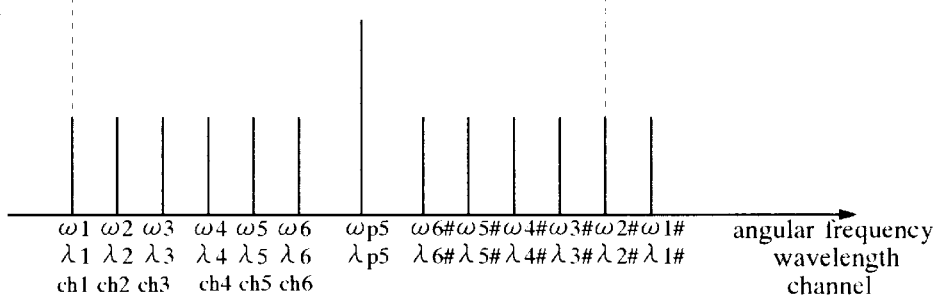

FIG. 6
A. 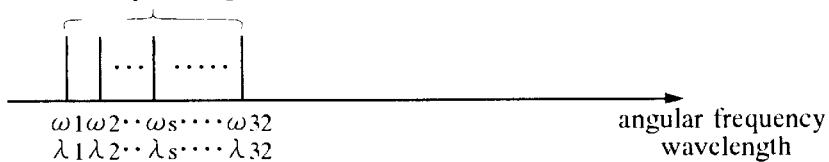
B. 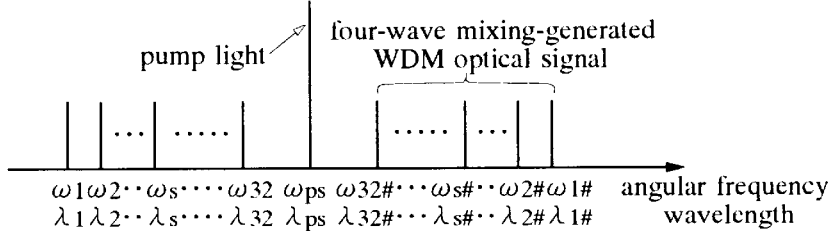
C. 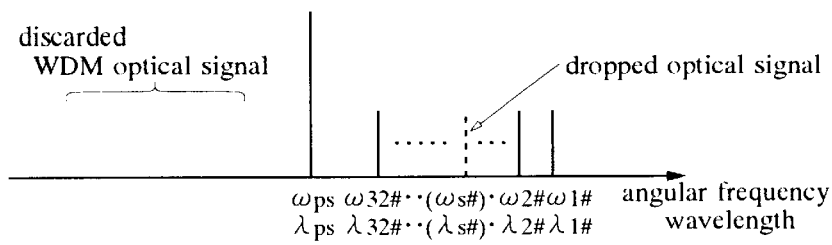
D. 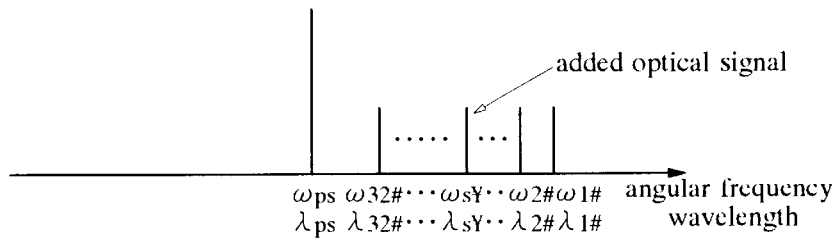
E. 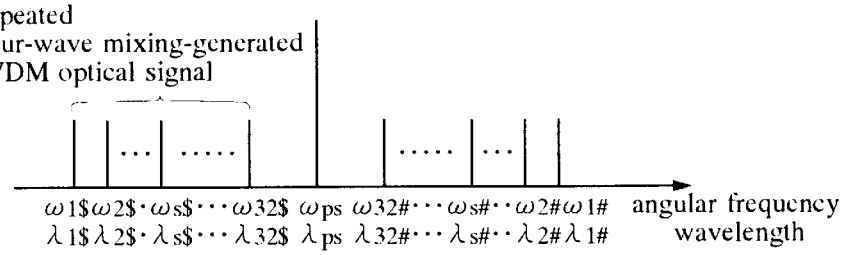
F. 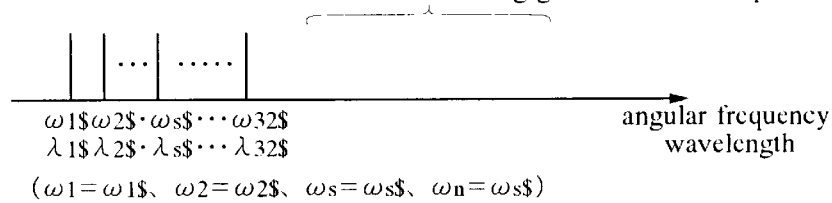

FIG. 9
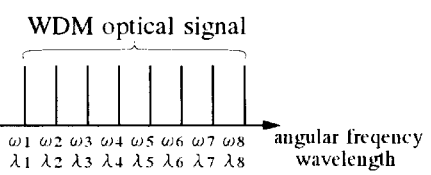
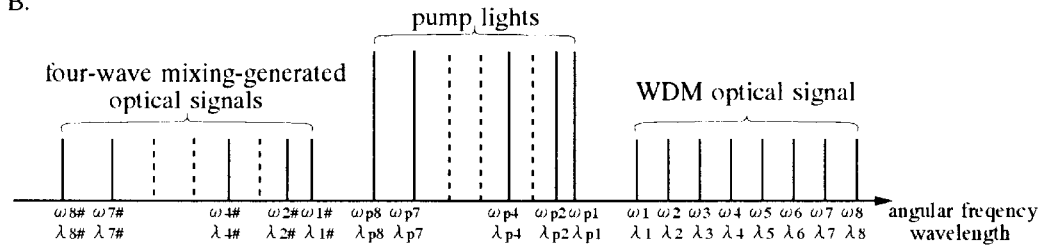
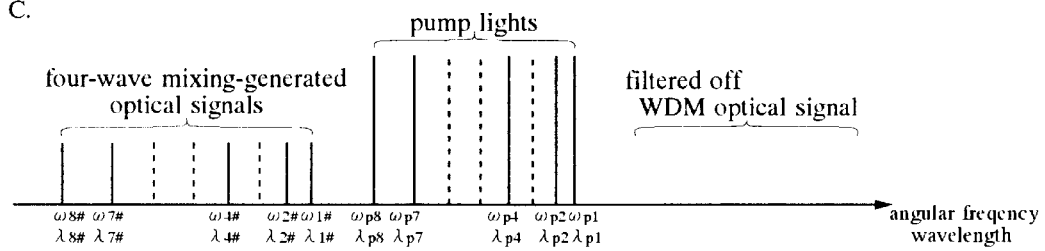
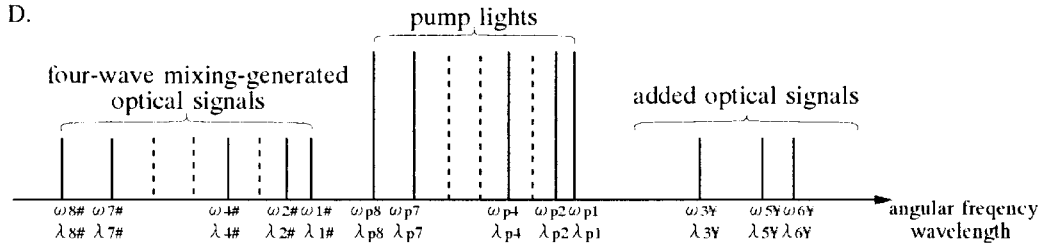
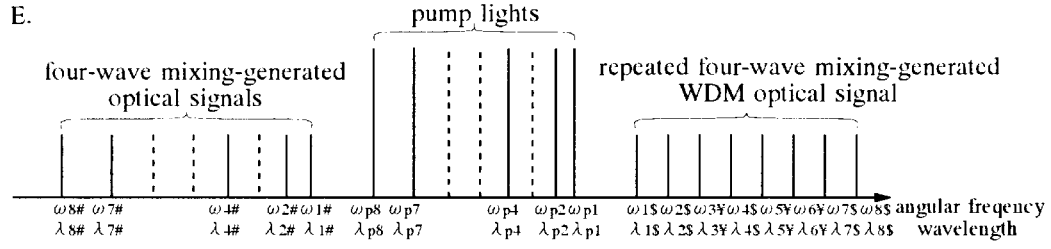
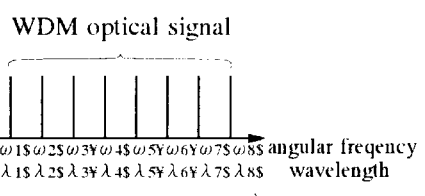
($\omega 1=\omega 1\$$, $\omega 2=\omega 2\$$, $\omega 3=\omega 3¥$, $\omega 4=\omega 4\$$, $\omega 5=\omega 5¥$, $\omega 6=\omega 6¥$, $\omega 7=\omega 7\$$, $\omega 8=\omega 8\$$)

FIG. 10
A.
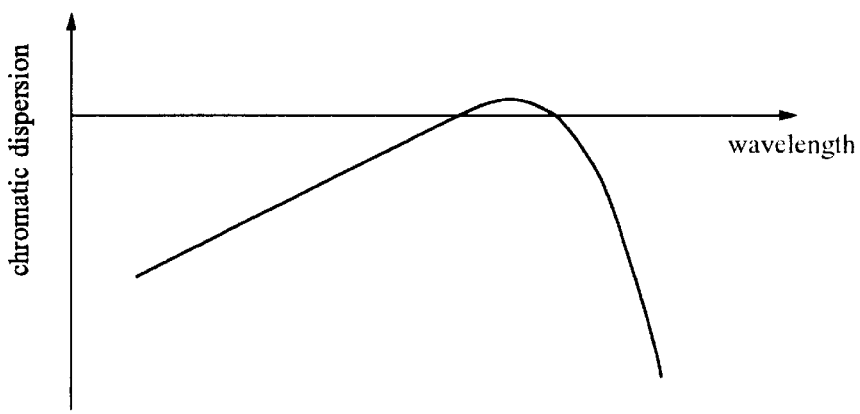
B.
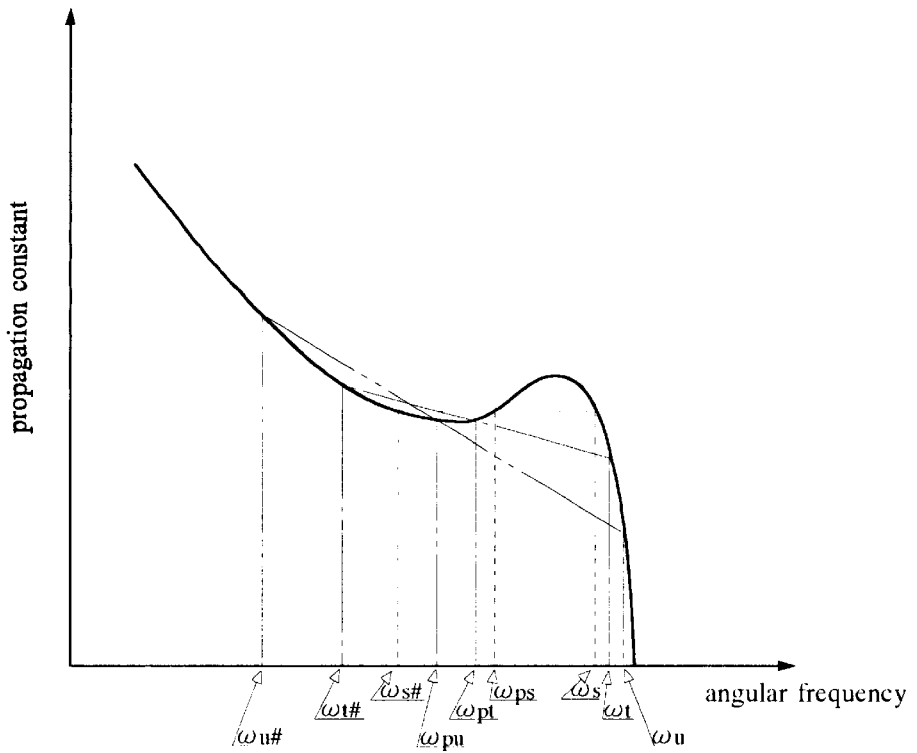

FIG. 12
A.
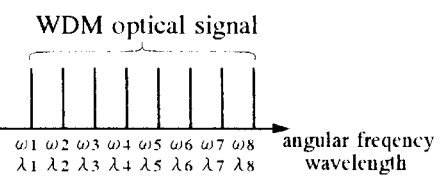
B.
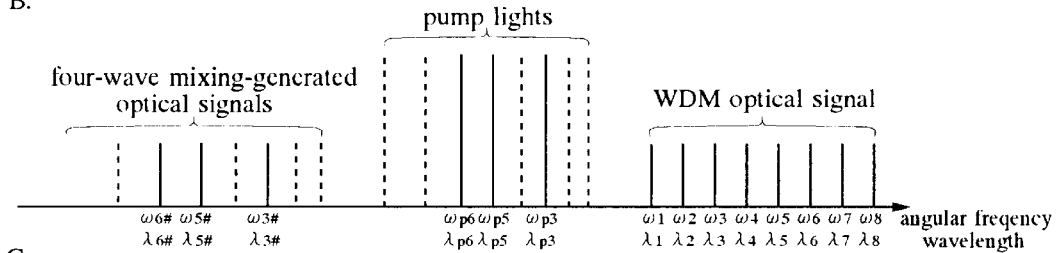
C.
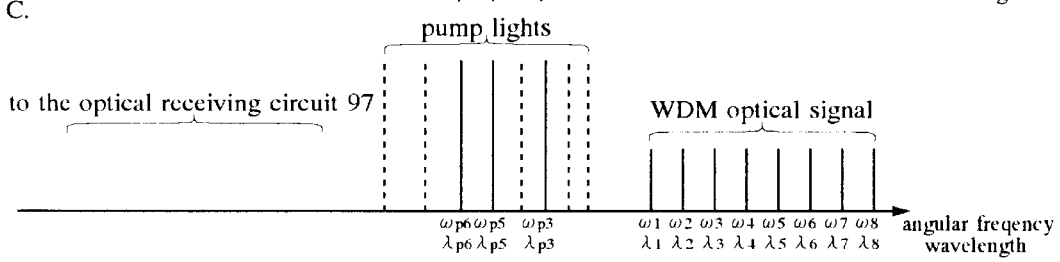
D.
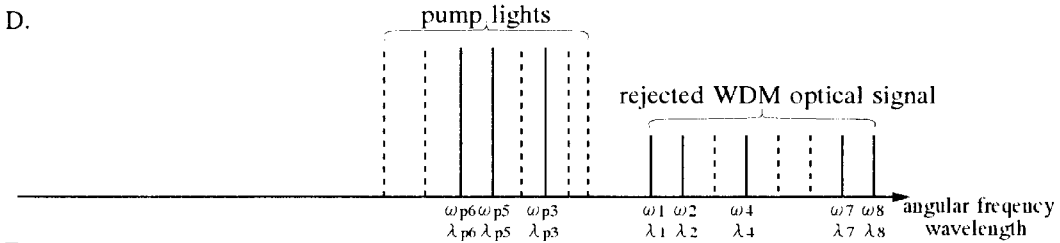
E.
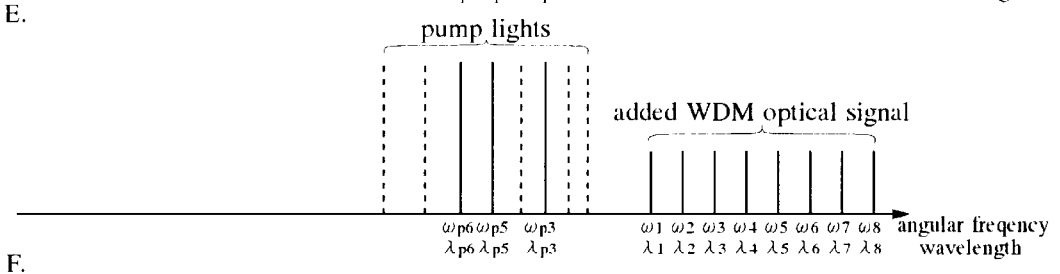
F.
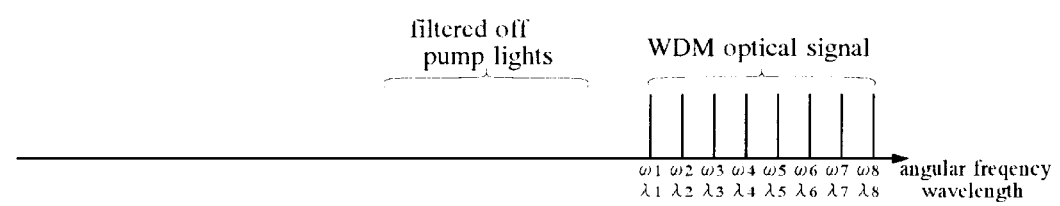

OPTICAL DROPPING APPARATUS AND OPTICAL ADD/DROP MULTIPLEXER

BACKGROUND OF THE INVENTION

1. Field of the Invention

The present invention relates to an optical dropping apparatus for dropping optical signals from wavelength-division multiplexing signals by using four-wave mixing and further to an optical add/drop multiplexer for dropping/adding/passing wavelength-division multiplexing signals by using four-wave mixing.

Ultra-long-distance and large-capacity optical communication apparatuses are now required to construct future multimedia networks. Concentrated studies are now being made of the wavelength-division multiplexing as a method for realizing large-capacity apparatuses in view of such advantages that it can effectively utilize a wide bandwidth and a large capacity of an optical fiber.

Especially in recent years, there has been demanded not only the optical communication system for sending/receiving a WDM optical signal between two terminal stations but also the optical communication system having the ADM (Add-Drop Multiplexer) function through the repeater stations called the "nodes" and disposed midway of an optical transmission line. This ADM function is to selectively pass only an optical signal having a special wavelength, of the wavelengh-division multiplexing optical signals, to drop the optical signals of the remaining wavelengths with the nodes, and to add another optical signal from that node and send it to another node. For these functions, there have been vigorously investigated the optical add/drop multiplexer (as will be abbreviated as the "OADM") having the ADM functions and acting as the key device of the optical communication system.

2. Description of the Related Art

This OADM is disclosed, for example, in Laid-open Japanese Patent Application Publication No. 11-055184.

In an OADM 120, as shown in FIG. 13, a WDM optical signal from the precedent node are inputted into one T1 of three ports T1, T2 and T3 of an optical circulator (as will be abbreviated as the "OC") 110.

In this OC 110: the optical beam inputted from the port T1 is outputted to the port T2; the optical beam inputted from the port T2 is outputted to the port T3; and the optical beam inputted from the port T3 is outputted to the port T1. The port T2 of the OC 110 is connected with an optical fiber Bragg grating filter 111 (as will be abbreviated as the "FBG") for reflecting only an optical beam of a predetermined wavelength $\lambda y$ and for passing optical beams of the remaining wavelengths. The port T3 of the OC 110 is connected with optical receiving circuit for receiving/processing the optical signals.

The optical signals of the remaining wavelengths (except the optical signal of the wavelength $\lambda y$) passed through the FBG 111 are inputted into an FBG 113 through an optical isolator (as will be abbreviated as the "ISO") 112 for passing an optical beam only in one direction. The FBG 113 also reflects only the optical beam of the predetermined wavelength $\lambda y$ and passes the optical beams of the remaining wavelengths.

The optical signals passed through the FBG 113 are multiplexed with the optical signal of the wavelength $\lambda y$ inputted from the port T3 of an OC 114 having actions similar to those of the OC 110. The optical signal thus multiplexed is inputted into the port T1 of the OC 114 and is outputted from the port T2 to a subsequent node. On the other hand, the port T3 of the OC 114 is connected with an optical sending circuit for sending the optical signal of the wavelength $\lambda y$. Here, the ISO 112 prevents the multiple reflection between the FBG 111 and the FBG 113.

In this OADM 120, the optical signal having the predetermined wavelength $\lambda y$ of the inputted WDM optical signal is reflected on the FBG 111 and inputted into the port T2 of the OC 110. Moreover, the optical signal of the wavelength $\lambda y$ is dropped by the OC 110 from the port T2 to the port T3. On the other hand, the optical signals of the remaining wavelengths passed through the FBG 111 are multiplexed with the optical signal of the wavelength $\lambda y$, as added from the port T3 of the OC 114, and are outputted from the port T2 of the OC 114 to another node.

Here in the OADM 120 shown in FIG. 13, the reflection wavelengths of the FBGS 111 and 113 are fixed. As a result, the wavelength $\lambda y$ of the optical signal dropped/added is determined at the time of constructing an optical transmission system so that the wavelength of the optical signal dropped/added cannot be arbitrarily changed during the time the optical transmission system is running.

When a plurality of wavelengths are to be dropped/added, moreover, the number of OADMs 120 required is equal to that of the optical signals to be dropped/added, so that the optical circuit is required to have more parts and complicated more.

SUMMARY OF THE INVENTION

An object of the invention is to provide an optical dropping apparatus which is able to drop an optical signal of an arbitrary wavelength from a WDM optical signal by using four-wave mixing in optical fibers.

Another object of the invention is to provide an optical adding/dropping apparatus which is able to add/drop an optical signal of an arbitrary wavelength from WDM optical signal by using the four-wave mixing in optical fibers.

Another object of the invention is to provide an optical dropping apparatus which is able to drop a plurality of optical signals having arbitrary wavelengths by using four-wave mixing in optical fibers.

And another object of the invention is to provide an optical adding/dropping apparatus which is able to add/drop a plurality of optical signals having arbitrary wavelengths by using the four-wave mixing in optical fibers.

The above-specified objects can be achieved by an apparatus comprising: generating part for four-wave mixing; dropping part for dropping light of a predetermined wavelength; and controlling part for controlling the wavelength of pump light which is used for four-wave mixing in the generating part.

In this apparatus, light of the predetermined wavelength is dropped from the lights generated by four-wave mixing. In this apparatus, moreover, the wavelength of the optical signals, before occurring four-wave mixing between pump light, can be changed by changing the wavelength of the pump light, so light of an arbitrary wavelength can be dropped.

In this apparatus, on the other hand, the generating part four-wave mixing occurs only in the light of the predetermined wavelength, of a plurality lights, when one pump light acts on the lights of a plurality of wavelengths.

This apparatus can drop/add a light from the light to occur four-wave mixing. Alternatively, the apparatus can drop the light generated by four-wave mixing and can drop/add one of the lights in which four-wave mixing occured. As a result, the apparatus can drop/add a plurality of lights of arbitrary wavelengths.

BRIEF EXPLANATION OF THE DRAWINGS

The nature, the principle, and utility of the invention will become more apparent from the following detailed description when read in conjunction with the accompanying drawings in which like numbers are designated by identical reference numbers, in which:

FIGS. 2A to 2D are diagrams for explaining the principle of dropping/adding an arbitrary optical signal by four-wave mixing;

FIGS. 6A to 6F are diagrams showing optical spectra at individual portions of an OADM according to a fifth embodiment;

FIGS. 9A to 9F are diagrams showing optical spectra at individual portions of the OADM according to the sixth embodiment;

FIGS. 10A and 10B are graphs illustrating chromatic dispersion characteristics and propagation constant characteristics of optical fibers for occurring four-wave mixing in the OADM of the sixth embodiment;

FIGS. 12A to 12F are diagrams showing optical spectra at individual portions of the OADM according to the seventh embodiment.

DETAILED DESCRIPTION OF THE PREFERRED EMBODIMENTS

Figure 1:
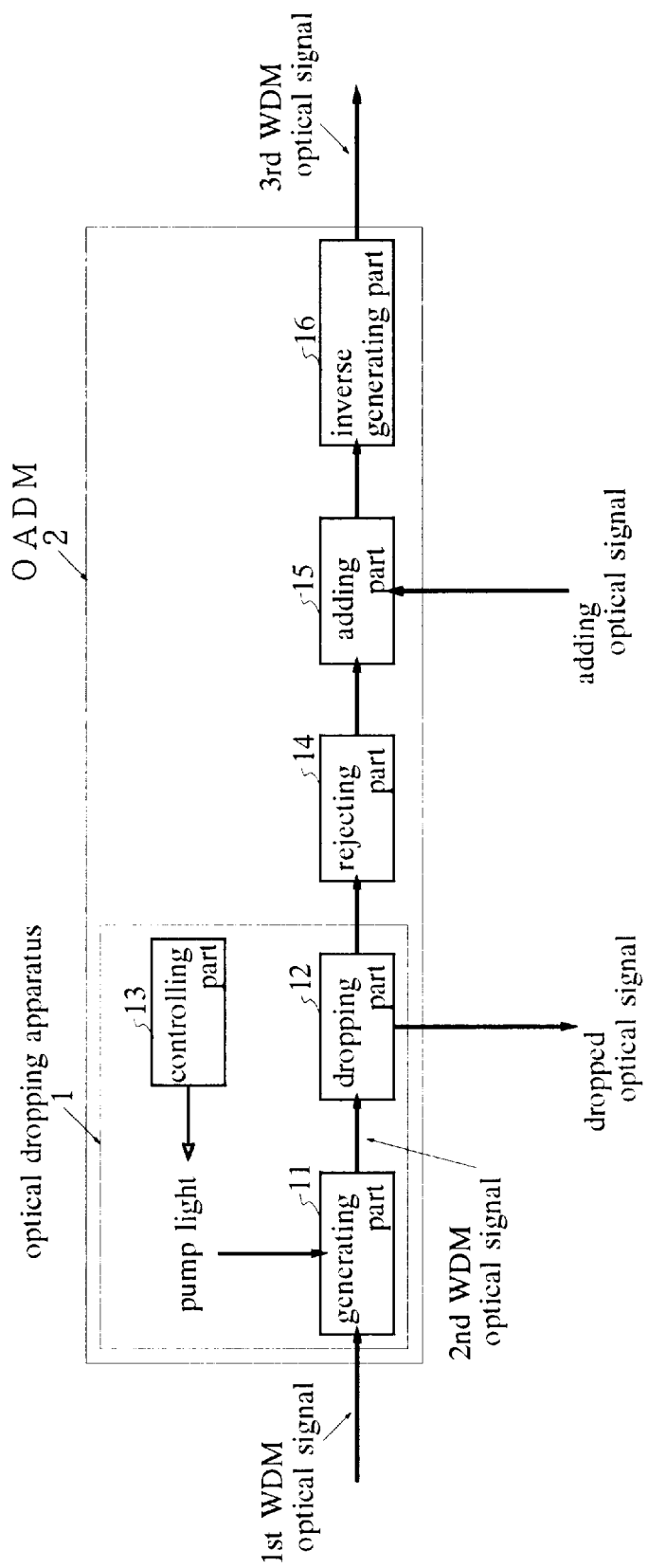
FIG. 1 is a diagram showing a construction of an OADM according to a first embodiment.

Embodiments of the invention will be described with reference to the accompanying drawings. In these Figures, the same constructions are designated by the same reference numerals, and their repeated description may be omitted.

[First Embodiment]

In a first embodiment, as shown in FIG. 1, a first WDM optical signal having a plurality of optical signals of different wavelengths multiplexed are inputted into a generating part 11. This generating part 11 generates second WDM optical signal by occurring four-wave mixing between the first WDM optical signal and an inputted pump light.

The first WDM optical signal and the second WDM optical signal are inputted into a dropping part 12 disposed downstream of the generating part 11. The dropping part 12 drops a light of a predetermined wavelength. A controlling part 13 controls the wavelength of the pump light.

An optical dropping apparatus 1 is constructed to include the generating part 11, the dropping part 12 and the controlling part 13 thus far described.

The first WDM optical signal and the second WDM optical signal, from which the light of the predetermined wavelength was dropped, are inputted into a rejecting part 14 disposed downstream of the dropping part 12. The rejecting part 14 rejects the first WDM optical signal.

Here, FIG. 1 shows the construction in which the rejecting part 14 is disposed downstream of the dropping part 12, but the rejecting part 14 may be disposed upstream of the dropping part 12. In short, the rejecting part 14 is disposed upstream or downstream of the dropping part 12.

The second WDM optical signal outputted from the rejecting part 14 are inputted into an adding part 15. This adding part 15 adds an optical signal of the same wavelength as the predetermined one which was dropped by the dropping part 12.

The second WDM optical signal, to which the optical signal was added at the adding part 15, are inputted into an inverse generating part 16 disposed downstream of the adding part 15. The inverse generating part 16 generates third WDM optical signal by occurring four-wave mixing between the second WDM optical signal and the pump lights.

Thus, the OADM 2 is constructed to include the generating part 11, the dropping part 12, the controlling part 13, the rejecting part 14, the adding part 15 and the inverse generating part 16.

The actions of the first embodiment will be described with reference to FIG. 2.

FIGS. 2A to 2D illustrate optical spectra individually, and the abscissa indicates an angular frequency (a wavelength and a channel). Here, the channel will be abbreviated as the "ch".

Four-wave mixing is the phenomenon by which three lights generate a fourth light through a cubic nonlinear polarization. When two of the three lights have the same angular frequency, a light of an angular frequency ωc is generated from two lights of angular frequencies ωa and ωb, as illustrated in FIG. 2A. Among these angular frequencies, there holds the following Equation:

$$\omega c = 2\omega b - \omega a \qquad [\text{Eq. 1}].$$

This Eq. 1 corresponds to the law of energy conservation.

In the optical dropping apparatus 1 and the OADM 2 of the first embodiment, the light of the frequency ωa corresponds to each ch of the WDM optical signal, and the light of the angular frequency ωb (or a wavelength λb) corresponds to the pump light. Moreover, the dropping/adding actions are made by using the light of the angular frequency ωc which is generated by four-wave mixing.

The actions to drop/add any ch will be described with reference to FIGS. 2B to 2D.

For the WDM optical signal, the actions will be described by using the wavelength λ. In four-wave mixing, however, the description is made by using the angular frequency. Therefore, the actions of the invention will be described by using the angular frequency, and the wavelength is used only if necessary for the description. For this, a wavelength corresponding to the angular frequency ωz is designated by a wavelength λz.

FIG. 2B illustrates the case in which a ch5 is to be dropped/added from a WDM optical signal of six waves, and FIG. 2D illustrates the case in which a ch2 is to be dropped/added from a WDM optical signal of six waves. Moreover, FIG. 2C illustrates the position of the angular frequency ωr of the light to be dropped/added. In this embodiment, the angular frequency ωr is fixed irrespective of the ch to be dropped/added.

For simplifying the description, here will be described six-wave WDM optical signal. However, a WDM optical signal of arbitrary degree of multiplexes could likewise be considered.

The angular frequency of a chj in the six-wave WDM optical signal is designated by ωj, and the angular frequency of the pump light for establishing the four-wave mixing to drop/add a chk is designated by ωpk. In this case, the angular frequency of the light to be generated by the four-wave mixing for the chj is designated by ωj#. For example, the ch1 has an angular frequency ω1. The pump light in the case of dropping/adding the ch1 has the angular frequency ωp1. The four-wave mixing-generated light has the angular frequency ω1#.

First of all, in the case of dropping/adding the ch5, the generating part 11 generates second WDM optical signal of angular frequencies ω1# to ω6# by occurring four-wave mixing in the first WDM optical signal having angular frequencies of ω1 to ω6. Here, the individual chs of the second WDM optical signal contain the same information as the individual chs of the respectively corresponding original first WDM optical signal.

The optical dropping apparatus 1 and the OADM 2 of the first embodiment drop/add the optical signals by using the four-wave mixing-generated optical signals. It is, therefore, necessary that the angular frequency ω5# of the optical signal generated by occurring four-wave mixing in the optical signals of the ch5 be aligned with the angular frequency ωr of the optical signal to be dropped/added. In other words, the following relation is necessary, as illustrated in FIG. 2B:

$$\omega r = \omega 5\# \qquad [\text{Eq. 2}].$$

In order to satisfy this [Eq. 2], the controlling part 13 controls the wavelength λp5 of the pump light, i.e., the angular frequency ωp5 to satisfy the following Equation with reference to the [Eq. 1]:

$$\omega p5 = (\omega 5 + \omega r)/2 \qquad [\text{Eq. 3}].$$

If the angular frequency ωp of the pump light is thus controlled, the dropping part 12 can drop the predetermined wavelength λr, i.e., the optical signal of the angular frequency ωr so that it can drop the optical signal of the angular frequency ω5#, i.e., the ch5.

On the other hand, the rejecting part 14 rejects the first WDM optical signal. The reason why the first WDM optical signal (of the angular frequencies ω1 to ω6) are thus rejected is that the optical signals corresponding to the optical signals of the angular frequencies ω1 to ω6 are generated by the inverse generating part 16, as will be described hereinafter.

Moreover, the adding part 15 can add the optical signal to the position of the angular frequency ω5#, which is "emptied" by the extraction, in the second WDM optical signal. After this, the second WDM optical signal, to which the optical signal of the angular frequency ω5# was added, are made to occur four-wave mixing again between the pump light of the angular frequency ωp5 by the inverse generating part 16. The angular frequencies of the individual optical signals generated by this repeated four-wave mixing satisfy the [Eq. 1] to become the angular frequencies ω1 to ω6. In other words, the wavelengths of the individual chs in the third WDM optical signal correspond to the wavelengths of the individual chs in the first WDM optical signal. As a result, the adding part 15 and the inverse generating part 16 can be outputted from the WDM optical signal, which are prepared by adding a new optical signal to the ch5, from the inverse generating part 16.

When the ch2 is to be dropped/added, on the other hand, it is necessary that the angular frequency ω2# of the optical signal generated by four-wave mixing the optical signals of the ch2 be coincident with the angular frequency ωr of the optical signal to be dropped/added. Therefore, the wavelength λp2 of the pump light, i.e., the angular frequency ωp2 may be controlled according to the following Equation by the controlling part 13:

$$\omega p2 = (\omega 2 + \omega r)/2 \qquad [\text{Eq. 4}].$$

By thus controlling the angular frequency ωp of the pump light, the dropping part 12 can drop the optical signal of the angular frequency ω2#, i.e., the ch2. The adding part 15 can add the new optical signal corresponding to the ch2, to the "emptied" position of the angular frequency ω2#.

When the chk is to be dropped/added from the WDM optical signal of n waves, generally, the controlling part 13 may control the wavelength λpk of the pump light, i.e., the angular frequency ωpk according to the following [Eq. 6] so as to satisfy the following [Eq. 5]:

$$\omega r = \omega k\# \qquad [\text{Eq. 5}];$$

and $$\omega pk = (\omega k + \omega r)/2 \qquad [\text{Eq. 6}].$$

Since the angular frequency ωn takes a discrete numerical value, however, the angular frequency ωpk also takes a discrete numerical value. The angular frequency ωpk is expressed by the following range:

$$(\omega 1 + \omega r)/2 \leq \omega pk \leq (\omega n + \omega r)/2 \qquad [\text{Eq. 7}].$$

Since the controlling part 13 controls the angular frequency ωp of the pump light according to [Eq. 6], therefore, the optical dropping apparatus 1 and the OADM 2 of the first embodiment are enabled to drop/add an arbitrary ch with the dropping part 12 for dropping the light of a predetermined wavelength, by using four-wave mixing.

Since the angular frequency of the optical signal to be dropped is always at the constant angular frequency ωr irrespective of the dropped ch, moreover, the optical receiving apparatus for a dropped optical signal may be any if it can receive/process the optical signal of the angular frequency ωr. Since the angular frequency of the optical signal to be added is always constant at the angular frequency ωr irrespective of the added ch, still moreover, the optical sending apparatus for an added optical signal may be any apparatus as long as it can generate the optical signal of the angular frequency ωr. This makes it unnecessary to prepare the optical receiving apparatus and the optical sending apparatus for each ch, so that the OADM equipped with those apparatus can be simplified.

Here in the first embodiment, the generating part 11 is preferably exemplified by the optical fibers having a substantially zero chromatic dispersion in the wavelength range of the pump light. By using these optical fibers, the optical dropping apparatus 1 and the OADM 2 of the first embodiment is enabled to have no deviation in the wavelength characteristics of the four-wave mixing.

Generally, the refractive index of the optical fibers has a two-stage distribution in which the core is higher whereas the cladding is lower. The optical fibers thus far described can be manufactured not only by enlarging the refractive index of the core and reducing the refractive index of the cladding but also by forming such a fine region at the boundary between the core and the cladding as to reduce the refractive index on the core side and enlarge the refractive index on the cladding side, as in dispersion flattened optical fibers.

Next, the second embodiment will be explained.

[Second Embodiment]

Figure 3:
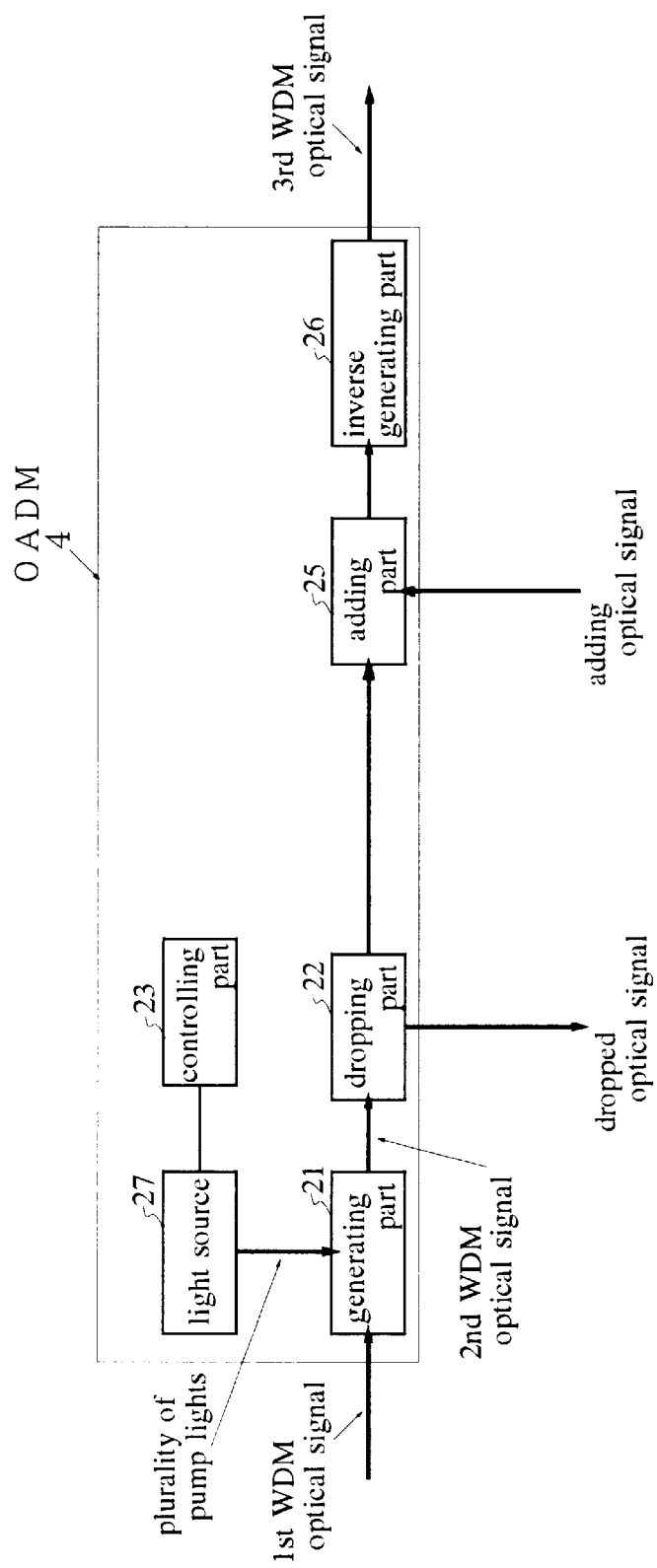
FIG. 3 is a diagram showing a construction of an OADM according to a second embodiment.

In an OADM 4 of a second embodiment, as shown in FIG. 3, first WDM optical signal, as prepared by multiplexing a plurality of optical signals of different wavelengths, are inputted into a generating part 21. A plurality of pump lights is also inputted in to the generating part 21. These individual pump lights are prepared for the individual optical signals in the first WDM optical signal.

For each of these pump lights, the generating part 21 generates second WDM optical signal which were prepared by occurring four-wave mixing in an optical signal of a predetermined wavelength of the first WDM optical signal.

The first WDM optical signal and the second WDM optical signal are inputted into a dropping part 22 disposed downstream of the generating part 21. The dropping part 22 drops the first WDM optical signal.

The second WDM optical signal outputted from the dropping part 22 are inputted into an adding part 25 disposed downstream of the dropping part 22. The adding part 25 adds the optical signal, which was given the same wavelength as that prepared by occurring four-wave mixing with the pump light at the generating part 21, to the second WDM optical signal.

The second WDM optical signal, to which that optical signal was added, are inputted into an inverse generating part 26 disposed downstream of the adding part 25. The inverse generating part 26 generates third WDM optical signal by occurring four-wave mixing between the second WDM optical signal, to which the optical signal was added, and the pump light.

Moreover, a controlling part 23 generates a predetermined pump light from a plurality of pump lights, at a light source 27. The light source 27 generates a plurality of pump lights of different wavelengths.

The generating part 21 of the second embodiment is optical fibers for generating only light generated by four-wave mixing of an angular frequency $\omega x\#$ and a propagation constant $\beta x\#$ satisfying the following Equations simultaneously, when a light of an angular frequency $\omega x$ and a propagation constant $\beta x$ is subjected to the four-wave mixing with a pump light of an angular frequency $\omega px$ and a propagation constant $\beta px$:

$$\omega x + \omega x\# = 2\omega px \quad [Eq. 8];$$

and $$\beta x + \beta x\# = 2\beta px \quad [Eq. 9].$$

The generating part 11 shown in FIG. 1 generates the four-wave mixing-generated lights of the first # wavelength $\lambda 1\#$ to the n-th # wavelength $\lambda n\#$, when one pump light $\omega p$ acts, for all the optical signals in the first WDM optical signal, i.e., all the optical signals of the first wavelength $\lambda 1$ to the n-th wavelength $\lambda n$. On the contrary, however, the generating part 21 shown in FIG. 3 is characterized to satisfy the [Eq. 8] and the [Eq. 9] simultaneously so that it acts on only the predetermined optical signals $\omega x$ and $\beta x$ of the first wavelength $\lambda 1$ to the n-th wavelength $\lambda n$ for one pump light $\omega px$ and $\beta px$, to generate only the four-wave mixing-generated light $\omega x\#$ and $\beta x\#$ corresponding to that predetermined optical signal.

The plurality of pump lights are those of the first wavelength $\lambda p1$ to the n-th wavelength $-\lambda pn$ for occurring four-wave mixing with the first wavelength $\lambda 1$ to the n-th wavelength $\lambda n$.

The controlling part 23 controls the first WDM optical signal excepting the optical signal having the wavelength equal to that of the optical signal added by the adding part 25, to generate the pump light having the wavelength for occurring four-wave mixing. When the optical signals of the wavelength $\lambda 2$ and the wavelength $\lambda 4$ are added by the adding part 25, for example, the controlling part 23 generates the pump lights of the first pump light wavelength $\lambda p1$, the third pump light wavelength $\lambda p3$, and the fifth to n-th pump light wavelength $\lambda p5$ to the n-th pump light wavelength $\lambda pn$ for occurring four-wave mixing, for the optical signals of the wavelength $\lambda 1$, the wavelength $\lambda 3$, and the wavelength $\lambda 5$ to the wavelength $\lambda n$.

As a result, the lights to be outputted from the generating part 21 are the first WDM optical signal, the predetermined pump lights, and the second WDM optical signal corresponding to the optical signals to pass through the OADM.

The dropping part 22 drops the first WDM optical signal so that the lights to be outputted from the dropping part 22 are the predetermined pump light and the second WDM optical signal. The optical signal of the same wavelength as that occurred four-wave mixing between the pump light at the generating part 21 is added at the adding part 25 to the second WDM optical signal, and these optical signals are inputted into the inverse generating part 26.

Moreover, the inverse generating part 26 has the same characteristics as those of the generating part 21 for only occurring four-wave mixing satisfying the [Eq. 8] and the [Eq. 9] simultaneously. As a result, the signals to be outputted from the inverse generating part 26 are the predetermined pump light, the second WDM optical signal, optical signals added at the adding part 25, and the lights generated by repeatedly occurring four-wave mixing in lights generated by the four-wave mixing corresponding to the second WDM optical signal.

Here, the lights generated by repeated four-wave mixing, as generated by the four-wave mixing-generated lights corresponding to the second WDM optical signal, contain the same information as those of the optical signals to pass through that original OADM. Moreover, the wavelengths of the individual chs in the third WDM optical signal multiplexing the optical signals added at the adding part 25 with repeated four-wave mixing-generated lights correspond to the wavelengths of the individual chs in the first WDM optical signal. As a result, the adding part 25 and the inverse generating part 26 can be outputted from the WDM optical signal, to which the new optical signal was added, from the inverse generating part 26.

Thus, in the OADM 4 of the second embodiment, a plurality of optical signals of arbitrary wavelengths can be dropped/added by controlling the wavelengths and the number of the pump lights by the controlling part 23.

Next, the third embodiment will be explained.

[Third Embodiment]

Figure 4:
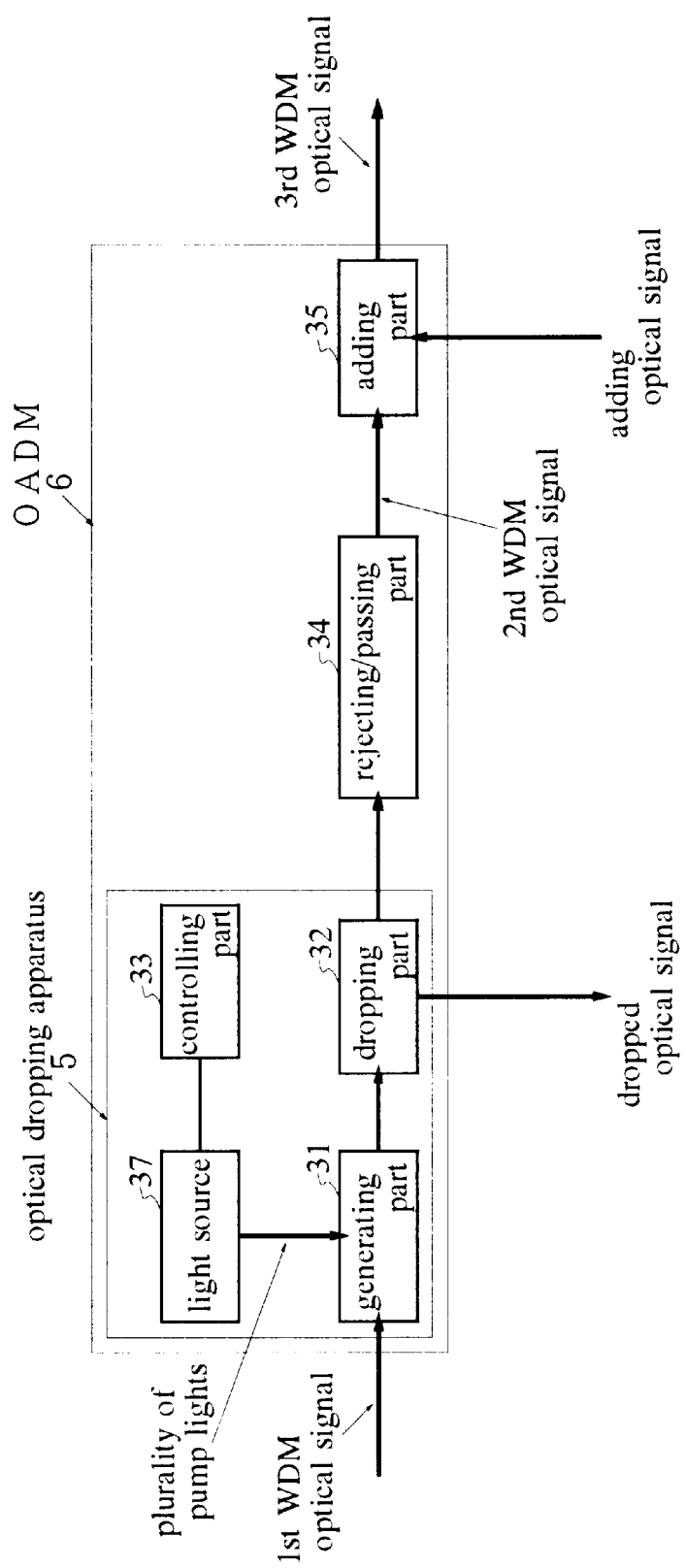
FIG. 4 is a diagram showing a construction of an OADM according to a third embodiment.

In an OADM 6 of a third embodiment, as shown in FIG. 4, first WDM optical signal, as prepared by multiplexing a plurality of optical signals of different wavelengths, are inputted into a generating part 31. A plurality of pump lights is also inputted into the generating part 31. These individual pump lights are prepared for every optical signal in the first WDM optical signal.

For each of these pump lights, the generating part 31 occurring four-wave mixing between an optical signal of a predetermined wavelength, of the first WDM optical signal, and one of the plurality of pump lights. The optical signals thus generated by the generating part 31 are dropped at a dropping part 32 disposed downstream of the generating part 31.

On the other hand, the first WDM optical signal outputted from the dropping part 32 are inputted into a rejecting part 34 disposed downstream of the dropping part 32. The rejecting part 34 rejects the optical signals, which were occurred four-wave mixing with a plurality of pump lights, from the first WDM optical signal, and is outputted from the second WDM optical signal filtered off those optical signals.

The outputted second WDM optical signal is inputted into an adding part 35 disposed downstream of the rejecting part 34. The adding part 35 adds the optical signals of the same wavelengths as those of the optical signals rejected at the rejecting part 34, to the second WDM optical signal.

Moreover, a control part 33 generates a predetermined pump light from the plurality of pump lights, at a light source 37. The light source 37 generates a plurality of pump lights of different wavelengths.

Thus, an optical dropping apparatus 5 is constructed to include the generating part 31, the dropping part 32 and the controlling part 33. The OADM 6 is constructed to include the generating part 31, the dropping part 32, the controlling part 33, the rejecting part 34 and the adding part 35.

Thus, an optical dropping apparatus 5 according to a third embodiment causes the four-wave mixing only in the optical signals to be dropped from the first WDM optical signal, by the generating part 31 satisfying the aforementioned [Eq. 8] and [Eq. 9]. Therefore, the optical dropping apparatus 5 can drop a plurality of optical signals of arbitrary wavelengths with a predetermined pump light.

In an OADM 6 according to the third embodiment, on the other hand, the first WDM optical signal are "emptied" for adding the optical signals, by dropping the optical signals which generated the four-wave mixing-generated lights dropped at the dropping part 32, by the rejecting part 34. In the OADM 6, moreover, the adding part 35 adds the optical signals to be added to that "emptied positions". In the OADM 6, therefore, a plurality of optical signals of arbitrary wavelengths can be dropped/added with a predetermined pump light.

Here in the first to third embodiments, the OADM 2, 4 or 6 may also be constructed to further include: an optical receiving part for receiving/processing optical signals dropped from the dropping part 12, 22 or 32; and an optical sending part for generating optical signals to be added at the adding part 15, 25 or 35.

Next, the fourth embodiment will be explained.

[Fourth Embodiment]

An OADM in a fourth embodiment drops/adds an arbitrary one ch of a WDM optical signal of 32 waves.

Figure 5:
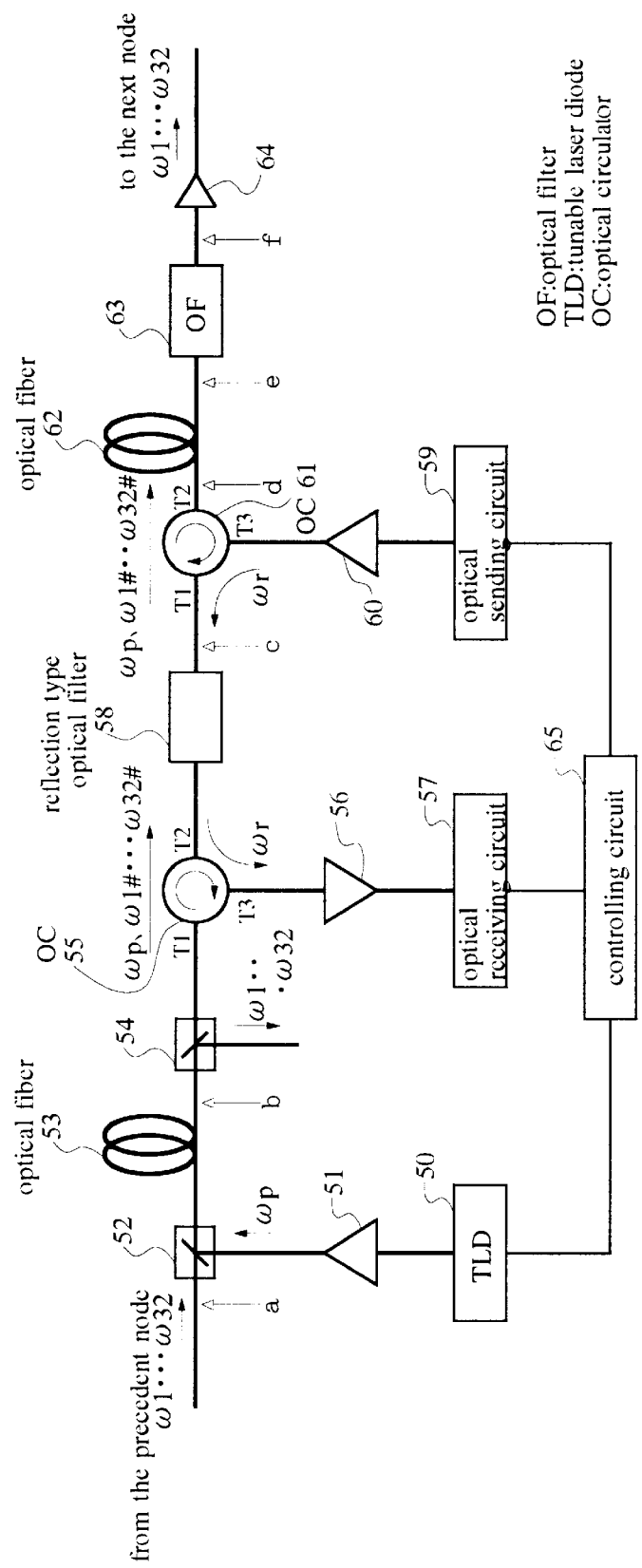
FIG. 5 is a diagram showing a construction of an OADM according to a fourth embodiment.

In FIG. 5, the WDM optical signal of 32 waves, as transmitted from the precedent node, are inputted into one entrance port of an optical coupler 52. On the other hand, a laser beam, as emitted by a tunable laser diode 50 (as will be abbreviated as the "TLD") having an oscillation angular frequency controlled by a later-described controlling circuit 65, is amplified by an erbium-doped fiber amplifier (as will be abbreviated as the "EDFA") for amplifying a light of a band of 1.55 $\mu$m, and is inputted into the other entrance port of the optical coupler 52. The TLD 50 is a variable wavelength Bragg reflection type semiconductor laser which has an oscillation wavelength (or an oscillation angular frequency) varied by controlling a driving current (or an injection current).

The WDM optical signal and the laser beam, as inputted into the optical coupler 52, are combined by the optical coupler 52 and are then inputted into the optical fibers 53.

Figure 7:
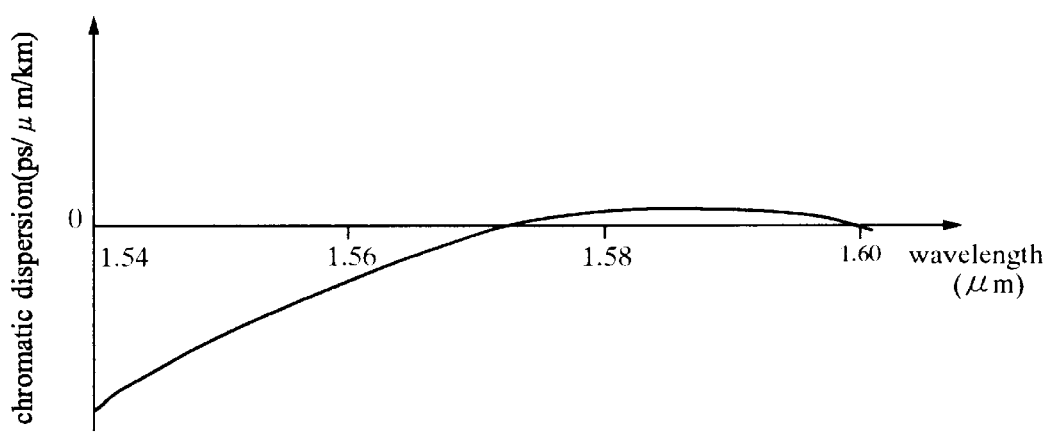
FIG. 7 is a graph illustrating chromatic dispersion characteristics of optical fibers for occurring four-wave mixing in the OADM of the fifth embodiment.

The optical fibers 53 are exemplified by those having chromatic dispersion characteristics illustrated in FIG. 7, that is, by dispersion flattened fibers having a low chromatic dispersion in the range from about 1.57 $\mu$m to about 1.60 $\mu$m. With these optical fibers 53, the WDM optical signal occurs four-wave mixing between a laser beam. Here, the ordinate of FIG. 7 indicates a chromatic dispersion at a unit of ps/$\mu$m/km, and the abscissa indicates a wavelength at a unit of $\mu$m.

The pump light, the WDM optical signal, and the four-wave mixing-generated WDM optical signal, outputted from the optical fibers 53, are inputted into an optical coupler 54 of a dielectric multilayer optical filter. This optical coupler 54 separates the wavelength band containing the WDM optical signal and the wavelength band containing the pump light and the four-wave mixing-generated WDM optical signal.

The WDM optical signal separated by the optical coupler 54 are outputted into the output port having no connection and are discarded or left. On the other hand, the pump light and the four-wave mixing-generated WDM optical signal, as separated by the optical coupler 54, are inputted into a port T1 of an OC 55 having ports T1, T2 and T3.

In this OC 55: the light inputted from the port T1 is outputted into the port T2; the light inputted from the port T2 is outputted to the port T3; and the light inputted from the port T3 is outputted into the port T1. These relations likewise apply to those of a later-described OC 61.

The four-wave mixing-generated WDM optical signal inputted into the port T1 of the OC 55 are outputted from the port T2 and inputted into a reflection type optical filter 58. This reflection type optical filter 58 is the FBG for reflecting only the optical signal having an angular frequency $\omega r$ (or a wavelength $\lambda r$) while passing the remaining optical signals. In other words, the center of the reflection wavelength is set at $\lambda r$, and the reflection wavelength band is set at the channel wavelength interval of the four-wave mixing-generated WDM optical signal.

The optical signal of the angular frequency $\omega r$, as reflected by the reflection type optical filter 58, is inputted again into the port T2 of the OC 55 and is outputted from the port T3. The optical signal of the angular frequency $\omega r$, as outputted from the port T3, is amplified by an EDFA 56 and is inputted into an optical receiving circuit 57 for receiving/processing the optical signal.

This optical receiving circuit 57 demodulates the dropped optical signal of the angular frequency $\omega r$ and either drops the information or sends the optical signal to another optical network (although not shown in FIG. 5) connected with that optical receiving circuit 57.

The four-wave mixing-generated WDM optical signal (containing no optical signal of the angular frequency $\omega r$) and the pump light, as having passed through the reflection type optical filter 58, are inputted into the port T1 of the OC 61.

On the other hand, the optical signal of the angular frequency $\omega r$, as generated by an optical sending circuit 59 for generating the optical signal to be added at this node, is inputted into and amplified by an EDFA 60. The optical sending circuit 59 can be constructed, for example, to include: a semiconductor laser for oscillating the laser beam of the angular frequency $\omega r$; and a Mach-Zehnder interferometer type optical modulator for modulating the laser beam coming from that semiconductor laser with the information to be transmitted.

The optical signal of the angular frequency $\omega r$ amplified by the EDFA 60 is inputted into the port T3 of the OC 61 and is further inputted through the port T1 into the reflection type optical filter 58. Moreover, the optical signal of the angular frequency ωr is reflected by the reflection type optical filter 58 and is inputted again into the port T1 of the OC 61.

The four-wave mixing-generated WDM optical signal (containing no optical signal of the angular frequency ωr) and the pump light, as inputted into the port T1 of the OC 61, and the optical signals of the angular frequency ωr are wavelength-multiplexed and are outputted through the port T2 of the OC 61 to optical fibers 62.

These optical fibers 62 occurs four-wave mixing again between the four-wave mixing-generated WDM optical signal (containing the optical signals of the angular frequency ωr) and the pump light, to generate the WDM optical signal by the repeated four-wave mixing.

The four-wave mixing-generated WDM optical signal (containing the optical signals of the angular frequency ωr) and the repeated four-wave mixing-generated WDM optical signal, as outputted from the optical fibers 62, are inputted into an optical filter 63.

This optical filter 63 is a dielectric multilayer optical filter for rejecting the WDM optical signal (containing the optical signals of the angular frequency ωr) and for passing the repeated four-wave mixing-generated WDM optical signal.

The repeated four-wave mixing-generated WDM optical signal outputted from the optical filter 63 are amplified by an EDFA 64 and are transmitted to a next node.

The actions of the fourth embodiment will be described.

In the OADM thus constructed, here will be described the actions of the case in which the chs (having the angular frequency ωs and the wavelength λs, wherein letter s indicates an integer defined by 1≦s≦32) are to be dropped/added from the WDM optical signal of 32 waves.

In the fourth embodiment, the wavelength (or angular frequency) of the light to be dropped/added is determined by the reflection wavelength λr (or angular frequency ωr) of the reflection type optical filter 58. As has been described in connection with the principle, therefore, it is necessary that the angular frequency ωs# of the light generated by the four-wave mixing the optical signals of the chs be aligned with the angular frequency ωr of the reflection type optical filter 58.

In order to drop/add the optical signals of the chs, therefore, the controlling circuit 65 may control the driving current of the TLD 50 such that the angular frequency ωp of the laser beam oscillated by the TLD 50 may satisfy the following Equation in accordance with the [Eq. 6]:

$$\omega p=\omega ps=(\omega s+\omega r)/2 \quad [\text{Eq. 10}].$$

For example, this Equation may be changed into ωp=ωp1=(ω1+ωr)/2, when the optical signal of ch1 is to be dropped/added, and into ωp=ωp5=(ω5+ωr)/2 when the optical signal of ch5 is to be dropped/added. For specific numerical values, the TLD 50 employs a wavelength of 1.58±0.01 μm, and the pump light is changed within a range of wavelengths of 1.58 μm to 1.61 μm, when the WDM optical signal of 32 waves are located at an interval of 0.8 nm in the band of wavelengths of 1.53 μm to 1.56 μm. With this pump light, optical signals are then generated by occurring four-wave mixing in the band of the wavelengths 1.62 μm to 1.65 ∞m of the WDM optical signal. In this case, the optical filter 63 may be set to reject the light of the wavelength of 1.61 μm.

Thus, the controlling circuit 65 controls the driving current of the TLD 50 for the optical signal of the ch to be dropped/added, in accordance with the [Eq. 10].

This TLD 50 oscillates the laser beam of the angular frequency ωps with the driving current according to the [Eq. 10]. This laser beam is amplified by the EDFA 51 and then inputted into the optical coupler 52. The gain of the EDFA 51 is sufficient for four-wave mixing at the optical fibers 53 and the optical fibers 62. Here, the EDFA 51 may be exemplified by an amplifier having several steps of cascaded optical fiber amplifiers for a sufficient gain, if this gain cannot be obtained by the single optical fiber amplifier.

The lights, as located at a in FIG. 5 and inputted from the precedent node to this node, are thirty-two optical signals (or a WDM optical signal) of angular frequencies ω1 to ω32, as illustrated in FIG. 6A. Here, the abscissa of FIG. 6 indicates the angular frequency (or wavelength).

These thirty two optical signals are combined at the optical coupler 52 with the laser beam of the angular frequency ωps and are inputted into the optical fibers 53. Moreover, the thirty two optical signals are subjected in the optical fibers 53 to occurring four-wave mixing between the laser beam of the angular frequency ωps according to the [Eq. 1]. As a result, the lights at the output ends of the optical fibers 53, as located at b in FIG. 5, are thirty two optical signals of angular frequencies ω1 to ω32, a laser beam of the angular frequency ωps, and thirty two four-wave mixing-generated optical signals of the angular frequencies ω1# to ω32#, as illustrated in FIG. 6B. Here, the four-wave mixing-generated optical signals individually contain the same information as those of the original optical signals.

These optical signals are filtered off the thirty two optical signals of the angular frequencies ω1 to ω32 at the optical coupler 54 so that the laser beam of the angular frequency ωps and the thirty two four-wave mixing-generated optical signals of the angular frequencies ω1# to ω32# are exclusively inputted into the port T1 of the OC 55.

These lights thus inputted into the port T1 are outputted from the port T2 and inputted into the reflection type optical filter 58. Of these lights, the light (i.e., the light of the angular frequency ωs) of the wavelength equal to the reflection wavelength λr of the reflection type optical filter 58 is reflected by the optical filter 58 so that the remaining lights are passed through the optical filter 58 and then inputted into the port T1 of the OC 61. In other words, the angular frequency of the laser beam is so controlled to ωs=ωs# as to satisfy the [Eq. 10], so that the optical signal of the angular frequency ωs# is reflected by the reflection type optical filter 58.

The reflected optical signal of the angular frequency ωs# is outputted from the port T2 of the OC 55 to the port T3 so that it is received/processed through the EDFA 56 by the optical receiving circuit 57. The reason why the optical signal of the angular frequency ωs# is amplified by the EDFA 56 is to retain the optical power necessary for the receiving/processing actions at the optical receiving circuit 57.

Here, the optical signal of the angular frequency ωs# contains the same information as that of the optical signal of the chs. Therefore, the receiving/processing actions of this optical signal of the angular frequency ωs# correspond to those of the chs.

In the OADM in the fourth embodiment, therefore, the chs can be dropped by the controlling circuit 65, the TLD 50, the EDFA 51, the optical coupler 52, the optical fibers 53, the OC 55 and the reflection type optical filter 58 and can be received/processed by the EDFA 56 and the optical receiving circuit 57.

On the other hand, the optical signal of the angular frequency ωs# is filtered off by the reflection type optical filter 58. As illustrated in FIG. 6C, therefore, the lights at c in FIG. 5 are the laser beam of the angular frequency ωps and the thirty-one four-wave mixing-generated optical signals of the angular frequencies ω1# to ω32# excepting the angular frequency ωs#. These thirty-one optical signals are inputted into the port T1 of the OC 61.

On the other hand, the optical signal of the angular frequency ωs# generated by the optical sending circuit 59 is so amplified by the EDFA 60 that it may be combined with the optical power of the thirty one optical signals, and is then inputted into the port T3 of the OC 61. The optical signal of the angular frequency ωs# thus generated is outputted from the port T1 of the OC 61, and is reflected because of ωr=ωs# by the reflection type optical filter 58 and inputted again into the port T1 of the OC 61.

The thirty one optical signals, as inputted into the port T1 of the OC 61, and the generated optical signal of the angular frequency ωs# are wavelength-multiplexed by the OC 61 and are outputted from the port T2. As a result, the lights at d in FIG. 5 are the laser beam of the angular frequency ωps and the thirty two four-wave mixing-generated optical signals of the angular frequencies ω1# to ω32# so that the generated optical signal of the angular frequency ωs# is added to the position corresponding to the chs having occurred four-wave mixing.

These thirty two optical signals of the angular frequencies ω1# to ω32# are inputted into the optical fibers 62. Moreover, these thirty two optical signals are subjected again in the optical fibers 62 to the four-wave mixing according to the [Eq. 1] by the laser beam of the angular frequency ωps. As a result, the lights, as located at e in FIG. 5, at the output ends of the optical fibers 62 are the thirty two optical signals of the angular frequencies ω1# to ω32#, the laser beam of the angular frequency ωps and the thirty two four-wave mixing-generated optical signals of the angular frequencies ω1$ to ω32$, as illustrated in FIG. 6E.

From the [Eq. 1], here hold the following Equations:

$$\omega 1\$=\omega 1, \omega 2\$=\omega 2, ---, \omega 31\$=\omega 31, \text{ and } \omega 32\$=\omega 32 \quad [\text{Eq. 11}].$$

Moreover, the thirty two optical signals of the angular frequencies ω1$ to ω32$ contain the same information as those of the thirty two optical signals of the angular frequencies ω1# to ω32#, respectively, so that the thirty two optical signals of the angular frequencies ω1$ to ω32$ contain the same information as those of the thirty two optical signals of the angular frequencies ω1 to ω32, respectively.

The thirty two optical signals of the angular frequencies ω1# to ω32#, the laser beam of the angular frequency ωps and thirty two optical signals of the angular frequencies ω1$ to ω32$, as outputted from the optical fibers 62, are inputted into the optical filter 63. Of these lights, the thirty two optical signals of the angular frequencies ω1# to ω32# and the laser beam of the angular frequency ωps are rejected by the optical filter 63. As illustrated in FIG. 6F, therefore, the lights, as located at f in FIG. 5 and at the output end of the optical filter 53, are the thirty-two optical signals of the angular frequencies ω1$ to ω32$, i.e., the thirty-two WDM optical signal of the angular frequencies ω1 to ω32.

Thus, the optical signal containing new information is added to the chs, and the thirty two WDM optical signal keeping the information before entrance into that node of the remaining ch are outputted to the next node.

In the OADM in the fourth embodiment, therefore, the chs can be added by the controlling circuit 65, the TLD 50, the EDFA 51, the optical coupler 52, the OC 61, the reflection type optical filter 58, the optical fibers 62 and the optical filter 63, and the chs can be generated by the EDFA 60 and the optical sending circuit 59.

On the other hand, the OADM in the fourth embodiment is advantageous in that it can employ an easily manufacturable reflection type optical filter of a fixed reflection wavelength, because the ch to be dropped/added is changed by changing the wavelength λp of the pump light.

In the OADM in the fourth embodiment, moreover, the ch to be dropped/added is changed by changing the wavelength λp of the pump light. It is, therefore, important to enhance the accuracy of the wavelength λp of the pump light. When the stability of the oscillation wavelength of the TLD by the controlling circuit 65 is insufficient, a wavelength locker for locking the oscillation wavelength of the TLD 50 is preferably disposed upstream or downstream of the EDFA 51.

Next, the fifth embodiment will be explained.

[Fifth Embodiment]

An OADM in a fifth embodiment drops/adds an arbitrary ch of a WDM optical signal of eight waves.

Figure 8:
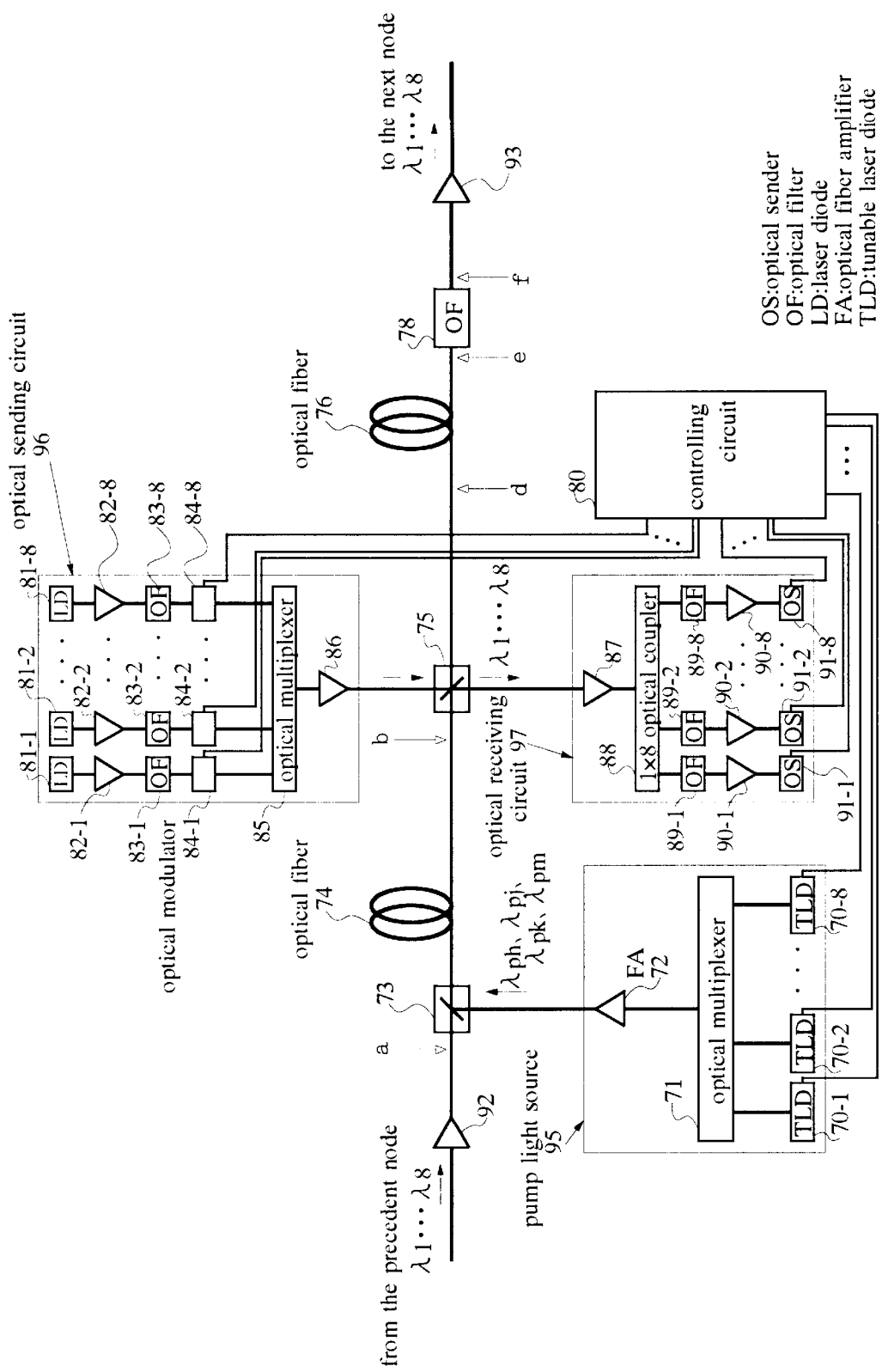
FIG. 8 is a diagram showing a construction of an OADM according to a sixth embodiment.

In FIG. 8, the WDM optical signal of eight waves, as transmitted from the precedent node, are inputted into and amplified by an EDFA 92 and are then inputted into one entrance port of an optical multiplexer 73.

On the other hand, the laser beams, as generated by eight TLDs 70 having their individual oscillation angular frequencies controlled by a later-described controlling circuit 80, are inputted into and combined by an optical multiplexer 71. The combined laser beam is amplified by an optical fiber amplifier (as will be abbreviated as the "FA") 72 and is inputted into the other entrance port of the WDM coupler 73. Each of the TLD 70 is a wavelength tunable Bragg reflector semiconductor laser which has an oscillation wavelength (or oscillation angular frequency) changed by controlling the driving current (or injection current).

These TLD 70, Optical multiplexer 71 and EDFA 72 construct a pump light source 95.

Here, the oscillation wavelengths of the individual TLDs 70 have to satisfy the [Eq. 8] and the [Eq. 9] for the individual optical signals of the WDM optical signal. When the stability of the oscillation wavelength of each TLD 70 by the controlling circuit 80 is insufficient, therefore, it is preferable to interposed a wavelength locker for locking the oscillation wavelength of each TLD 70 between the Optical multiplexer 71 and each TLD 70.

The WDM optical signal inputted into the Optical multiplexer 73 and the laser beam as the pump light are combined by the Optical multiplexer 73 and are inputted into optical fibers 74.

These optical fibers 74 have the chromatic dispersion characteristics, as illustrated in FIG. 10. As illustrated in FIG. 10A, more specifically, the chromatic dispersion angular frequency characteristics of the optical fibers 74 have a maximal value, and the chromatic dispersion is asymmetrical with respect to the maximal value as center angular frequency. Moreover, if the characteristics of the optical fibers 74 are expressed by the propagation constant—angular frequency characteristics, as illustrated in FIG. 10B, that asymmetry is such that the foregoing [Eq. 8] and [Eq. 9] simultaneously stand between the angular frequency and propagation constant, respectively, of the lights which are generated by four-wave mixing by the pump light of the angular frequency ωpx and the propagation constant βpx acting on the light of the angular frequency ωx and the propagation constant βx, when the angular frequency and propagation constant are designated by ωx# and βx#.

Here, the ordinate of FIG. 10A indicates the chromatic dispersion, and the abscissa indicates the wavelength. On the other hand, the ordinate of FIG. 10B indicates the propagation constant, and the abscissa indicates the wavelength.

Moreover, FIG. 10B illustrates each of the four-wave mixing-generated lights of the angular frequencies ωs#, ωt# and ωu#, which are generated by causing the pump lights of the angular frequencies ωps, ωpt and ωpu to act on the individually corresponding lights of the angular frequencies ωs, ωt and ωu, by way of example.

Reverting to FIG. 8, the WDM optical signal are subjected by the optical fibers 74 to the four-wave mixing with the laser beam as the pump light.

The pump light, the WDM optical signal and a four-wave mixing-generated WDM optical signal, as outputted from the optical fibers 74, are inputted into an optical multiplexer 75 of a dielectric multilayer optical filter.

On the other hand, the laser beam, as emitted from a semiconductor laser (as will be abbreviated as the "LD") 81-1 is inputted into an EDFA 82-1. The oscillation wavelength of the LD 81-1 corresponds to the wavelength λ1 of the ch1 of the WDM optical signal. The laser beam, as amplified by the EDFA 82-1, is inputted into an optical filter 83-1. This optical filter 83-1 is an FBG having its center reflection wavelength set to the wavelength λ1 or the wavelength of the ch1 and its reflectivity set low. Generally, the LD oscillates in multiple modes around the wavelength designed as the oscillation wavelength but is enabled to stabilize the oscillation wavelength of the LD 81-1 to the single-mode oscillation of the wavelength λ1 by using such optical filter 83-1. As a result, only the laser beam of the wavelength λ1 can be supplied to an optical modulator 84-1 connected with the optical filter 83-1. The optical modulator 84-1 is an externally modulating Mach-Zehnder interferometer type optical modulator to be controlled by the controlling circuit 80. The laser beam, as inputted into the optical modulator 84-1 is modulated with the information to be sent and is inputted as an optical signal into an optical multiplexer 85.

The optical circuit, as constructed to include the LD 81-1, the EDFA 82-1, the optical filter 83-1 and the optical modulator 84-1, is likewise made for each of the ch2 to the ch8. The LDs 81-2 to 81-8 and the optical filters 83-2 to 83-8 in the optical circuits of those individual chs are designed to have their oscillation wavelengths and center reflection wavelengths individually according to the wavelengths of the corresponding chs.

The LDs 81, the EDFAs 82, the optical filters 83, the optical modulators 84, the Optical multiplexer 85 and the EDFA 86 construct an optical sending circuit 96.

The individual optical signal chs outputted from the individual optical modulators 84 are inputted into the Optical multiplexer 85 and are combined into the optical signal to be added at this OADM. This optical signal is inputted into and amplified by the EDFA 86 and is inputted into the Optical multiplexer 75.

This Optical multiplexer 75 separates the WDM optical signal from the pump light, the WDM optical signal, and the four-wave mixing-generated WDM optical signal, outputted from the optical fibers 74 to an EDFA 87, and wavelength-multiplexes the optical signals to be added from the EDFA 86, with the pump light and the four-wave mixing-generated WDM optical signal.

The pump light, the four-wave mixing-generated WDM optical signal and the optical signals to be added are inputted into the optical fibers 74 and optical fibers 76 having similar chromatic dispersion and angular frequency characteristics so that they four-wave mix the pump light with the four-wave mixing-generated WDM optical signal again, thereby to generate the repeated four-wave mixing-generated WDM optical signal.

The pump light, the four-wave mixing-generated WDM optical signal, the optical signals to be added, and the repeated four-wave mixing-generated WDM optical signal, as outputted from the optical fibers 76, are inputted into an optical filter 78.

This optical filter 78 is a dielectric multilayer optical filter for rejecting the pump light and the four-wave mixing-generated WDM optical signal and for passing the optical signals to be added and the repeated four-wave mixing-generated WDM optical signal.

The repeated four-wave mixing-generated WDM optical signal, as outputted from the optical filter 78, is amplified by an EDFA 93 and are transmitted to the next node.

On the other hand, the WDM optical signal, as separated at the Optical multiplexer 75, are inputted into and amplified by the EDFA 87. The amplified WDM optical signal is inputted into 1×8 optical couplers 88 for branch a light into eight. The individual WDM optical signal thus branched is individually inputted into optical filters 89-1 to 89-8.

The optical filter 89-1 is a band-pass optical filter having a center wavelength set to the wavelength of the ch1. The optical signal of ch1 outputted from the optical filter 89-1 is amplified by an EDFA 90-1 and is inputted into an optical receiver 91-1. This optical receiver 91-1 is so controlled by the controlling circuit 80 as to demodulate the received optical signal ch1 thereby to drop the information or to send the optical signal ch1 to another optical network (although not shown in FIG. 8) connected with that optical receiver 91-1.

The optical circuit thus constructed of the optical filter 89-1, the EDFA 90-1 and the optical receiver 91-1 is likewise constructed for each of the ch2 to the ch8. The optical filters 89-2 to 89-8 in the optical circuits of those individual chs are designed to have their pass bands according to the wavelengths of the corresponding chs.

The EDFA 87, the 1×8 optical coupler 88, the optical filters 89, the EDFAs 90 and the optical receivers 91 construct an optical receiving circuit 97.

The actions of the fifth embodiment will be described.

The actions of the OADM thus constructed will be described on the case in which the ch3, the ch5 and the ch6 are to be dropped/added from the WDM optical signal of eight waves, for example.

In the fifth embodiment, the controlling circuit 80 selects the TLDs 70 of a number equal to that of the chs to pass without being dropped/added, from the eight TLDs 70. In this example, the ch3, the ch5 and the ch6 are dropped/added so that the five TLDs 70 such as the TLDs 70-1 to 70-5 are selected. Moreover, the controlling circuit 80 controls these five TLDs 70 to oscillate the pump lights of wavelengths λp1, λp2, λp4, λp7 and λp8 (or the angular frequencies ωp1, ωp2, ωp4, ωp7 and ω8) for the four-wave mixing of the ch1, the ch2, the ch4, the ch7 and the ch8.

Here, since the individual pump lights having oscillated are combined by the Optical multiplexer 71, it is arbitrary how the individual wavelengths λp1, λp2, λp4, λp7 and λp8 are assigned to the TLDs 70-1 to 70-5. For example: the wavelength λp1 may be assigned to the TLD 70-1; the wavelength λp2 may be assigned to the TLD 70-2; the wavelength λp4 may be assigned to the TLD 70-3; the wavelength λp7 may be assigned to the TLD 70-4; and the wavelength λp8 may be assigned to the TLD 70-5. Alternatively: the wavelength λp2 may be assigned to the TLD 70-1; the wavelength λp4 may be assigned to the TLD 70-2; the wavelength λp7 may be assigned to the TLD 70-3; the wavelength λp8 may be assigned to the TLD 70-4; and the wavelength λp1 may be assigned to the TLD 70-5. These combinations are arbitrary.

The pump lights of the angular frequencies $\omega p1$, $\omega p2$, $\omega p4$, $\omega p7$ and $\omega 8$, as combined at the Optical multiplexer 71, are amplified by the FA 72 and inputted into the Optical multiplexer 73. The gain of the FA 72 is sufficient for occurring four-wave mixing in the optical fibers 74 and the optical fibers 76.

The lights, as located at a in FIG. 8 and inputted from the precedent node to this node, are eight optical signals (or a WDM optical signal) of angular frequencies $\omega 1$ to $\omega 8$, as illustrated in FIG. 9A. Here, the abscissa of FIG. 9 indicates the angular frequency (or wavelength).

These eight optical signals are combined at the Optical multiplexer 73 with the pump lights of the angular frequencies $\omega p1$, $\omega p2$, $\omega p4$, $\omega p7$ and $\omega p8$ and are inputted into the optical fibers 74. Moreover, the eight optical signals are subjected in the optical fibers 74 to the four-wave mixing with the pump lights of the angular frequencies $\omega p1$, $\omega p2$, $\omega p4$, $\omega p7$ and $\omega p8$ according to the [Eq. 8] and the [Eq. 9]. As a result, the lights at the output ends of the optical fibers 74, as located at b in FIG. 8, are eight optical signals of angular frequencies $\omega 1$ to $\omega 8$, the pump lights of the angular frequencies $\omega p1$, $\omega p2$, $\omega p4$, $\omega p7$ and $\omega p8$, and five four-wave mixing-generated optical signals of the angular frequencies $\omega 1\#$, $\omega 2\#$, $\omega 4\#$, $\omega 7\#$ and $\omega 8\#$, as illustrated in FIG. 9B. Here, the four-wave mixing-generated optical signals individually contain the same information as those of the original optical signals.

Of these optical signals, the eight optical signals of the angular frequencies $\omega 1$ to $\omega 8$ are separated by the Optical multiplexer 75 and are then inputted into the optical receiving circuit 97 (as shown in FIG. 9C). Of these optical signals, moreover, the pump lights of the angular frequencies $\omega p1$, $\omega p2$ $\omega p4$, $\omega p7$ and $\omega p8$ and the five four-wave mixing-generated optical signals of the angular frequencies $\omega 1\#$, $\omega 2\#$, $\omega 4\#$, $\omega 7\#$ and $\omega 8\#$ are wavelength-multiplexed at the Optical multiplexer 75 with the optical signals (of the angular frequencies $\omega 3¥$, $\omega 5¥$ and $\omega 6¥$) of the ch3, the ch5 and the ch6, as generated by the optical sending circuit 96. As a result, at d in FIG. 8 and between the Optical multiplexer 75 and the optical fibers 76, there are the pump lights of the angular frequencies $\omega p1$, $\omega p2$, $\omega p4$, $\omega p7$ and $\omega p8$, the five four-wave mixing-generated optical signals of the angular frequencies $\omega 1\#$, $\omega 2\#$, $\omega 4\#$, $\omega 7\#$ and $\omega 8\#$ and the optical signals of the angular frequencies $\omega 3\#$, $\omega 5\#$ and $\omega 6\#$ of the ch3, the ch5 and the ch6 to be added, as illustrated in FIG. 9D.

Here, the separations of the optical signals of the angular frequencies $\omega 1$ to $\omega 8$ and the combinations of the optical signals of the angular frequencies $\omega 3¥$, $\omega 5¥$ and $\omega 6¥$ simultaneously occur in the optical coupler 75, so that the portion of the state illustrated in FIG. 9C is not shown in FIG. 8.

These optical signals are inputted into the optical fibers 76. Moreover, the five four-wave mixing-generated optical signals of the angular frequencies $\omega 1\#$, $\omega 2\#$, $\omega 4\#$, $\omega 7\#$ and $\omega 8\#$ are subjected again at the optical fibers 76 to four-wave mixing with the pump lights of the angular frequencies $\omega p1$, $\omega p2$, $\omega p4$, $\omega p7$ and $\omega p8$ according to [Eq. 8] and the [Eq. 9]. Here, the optical signals of the angular frequencies $\omega 3¥$ $\omega 5¥$ and $\omega 6¥$ of the ch3, the optical signals of the ch5 and the ch6 to be added do not cause four-wave mixing because they fail to satisfy the [Eq. 8] and the [Eq. 9]. Therefore, the lights, as at e in FIG. 8, at the output ends of the optical fibers 76 are the five four-wave mixing-generated optical signals of the angular frequencies $\omega 1\#$, $\omega 2\#$, $\omega 4\#$, $\omega 7\#$ and $\omega 8\#$, the pump lights of the angular frequencies $\omega p1$, $\omega p2$, $\omega p4$, $\omega p7$ and $\omega p8$, the repeated four-wave mixing-generated optical signals $\omega 1\$$, $\omega 2\$$, $\omega 4\$$, $\omega 7\$$ and $\omega 8\$$, and the optical signals of the angular frequencies $\omega 3¥$, $\omega 5¥$ and $\omega 6¥$ to be added, as shown in FIG. 9E.

From the [Eq. 8] and the [Eq. 9], here hold the following Equations:

$$\omega 1\$=\omega 1;\ \omega 2\$=\omega 2;\ \omega 4\$=\omega 4;\ \omega 7\$=\omega 7;\ \text{and}\ \omega 8\$=\omega 8 \quad [\text{Eq. 12}].$$

Moreover, the optical signals of the individual angular frequencies $\omega 1\$$, $\omega 2\$$, $\omega 4\$$, $\omega 7\$$ and $\omega 8\$$ individually contain the same information as those of the optical signals of the angular frequencies $\omega 1\#$, $\omega 2\#$, $\omega 4\#$, $\omega 7\#$ and $\omega 8\#$ so that the optical signals of the individual angular frequencies $\omega 1\$$, $\omega 2\$$, $\omega 4\$$, $\omega 7\$$ and $\omega 8\$$ individual contain the same information as those of the optical signals of the angular frequencies $\omega 1$, $\omega 2$, $\omega 4$, $\omega 7$ and $\omega 8$.

With the following Equations, therefore, the angular frequencies $\omega 3¥$, $\omega 5¥$ and $\omega 6¥$ are added to the grids of the ch3, the ch5 and the ch6, respectively:

$$\omega 3¥=\omega 3;\ \omega 5¥=\omega 5;\ \text{and}\ \omega 6¥=\omega 6 \quad [\text{Eq. 13}].$$

The four-wave mixing-generated optical signals, the pump lights, the repeated four-wave mixing-generated optical signals and the added optical signals, as outputted from the optical fibers 76, are inputted into the optical filter 78, so that the four-wave mixing-generated optical signals and the pump lights are rejected therefrom. As a result, the lights, as located at f in FIG. 8 and at the output ends of the optical filter 78, are the optical signals of the angular frequencies $\omega 1\$$, $\omega 2\$$, $\omega 4\$$, $\omega 7\$$ and $\omega 8\$$ and the optical signals of the angular frequencies $\omega 3¥$, $\omega 5¥$ and $\omega 6¥$, that is, the eight WDM optical signal of the angular frequencies $\omega 1$ to $\omega 8$.

Thus, the optical signals containing the new informations are added to the ch3, the ch5 and the ch6, the eight WDM optical signal keeping the information before entrance to the nodes of the remaining chs are outputted to the next nodes.

On the other hand, the ch3, the ch5 and the ch6 to be added are generated in the following manner.

The controlling circuit 80 drives the optical modulator 84-3 corresponding to the optical signal of the ch3 to modulate the laser beam, which is outputted from the LD 81-3 and inputted through the EDFA 82-3 and the optical filter 83-3, with the information to be sent, thereby to generate the ch3. Likewise, the controlling circuit 80 generates the optical signal of the ch5 by the LD 81-5, the EDFA 82-5, the optical filter 83-5 and the optical modulator 84-5, and the optical signal of the ch6 by the LD 81-6, the EDFA 82-6, the optical filter 83-6 and the optical modulator 84-6.

Here, the optical modulators 84 corresponding to the optical signals of the chs except the optical signals of the ch3, the ch5 and the ch6 are not driven so that the laser beams from the individual LD 81 are individually shaded by the optical modulators 84 and not inputted into the Optical multiplexer 85.

With a view to reliably shading the laser beams which were outputted from the LDs 81 for the chs except the chs to be added at this OADM, an optical attenuator or an optical switch may be connected between each of the optical modulators 84 and the Optical multiplexer 85. This optical attenuator or the optical switch is passed/shaded by the controlling circuit 80 in association with the corresponding optical modulator 84.

The optical signals of the ch3, the ch5 and the ch6 thus generated are wavelength-multiplexed by the Optical multiplexer 85 and amplified by the EDFA 86.

Thus, there are generated the optical signals of the ch3, the ch5 and the ch6 to be added, which are inputted into the Optical multiplexer 75.

On the other hand, the optical signals of the angular frequencies ω1 to ω8, as separated by the Optical multiplexer 75, are inputted into the individual optical receivers 91 through the EDFA 87, the 1×8 optical coupler 88, the optical filters 89 and the EDFAs 90. Here in each optical receiver 91, the passing band of each optical filter 89 is set for each ch so that only a predetermined ch is inputted.

Since the optical signals of the chs to be dropped at the OADM are optical signals of the ch3, the ch5 and the ch6, the controlling circuit 80 receives only the outputs of the corresponding optical receivers 91-3, 91-5 and 91-6 to drop the information contained in those chs.

The embodiment has been described on the case in which the optical signal of the ch3, the ch5 and the ch6 are to be dropped/added. By controlling the angular frequencies of the pump lights, the optical modulators 84 and the optical receivers 91 for the optical signals of the chs to be dropped/added, however, an arbitrary number of arbitrary optical signals of chs can be dropped/added.

In the embodiment thus far described, on the other hand, the number of optical signals of chs to be dropped is made coincident with the number of optical signals of chs to be added, but the latter number may be less than the former number. In this case, no optical signal is present in the grid of the ch which was not added.

In the OADM thus far described according to the fifth embodiment, an arbitrary number of arbitrary optical signals of chs can be dropped by the controlling circuit 80, the pump light source 95, the Optical multiplexer 73, the optical fibers 74 and the Optical multiplexer 75, and an arbitrary number of arbitrary optical signals of chs can be added by the optical sending circuit 96, the Optical multiplexer 75, the optical fibers 76 and the optical filter 78.

Next, the sixth embodiment will be explained.

[Sixth Embodiment]

The major difference between a sixth embodiment from the fifth embodiment resides in that the four-wave mixing is caused in the fifth embodiment at the optical signals corresponding to the channels to pass through the OADM but in the sixth embodiment at the optical signals corresponding to the channels to be dropped at the OADM.

The OADM in the sixth embodiment drops/adds an arbitrary ch from the WDM optical signal of eight waves.

Figure 11:
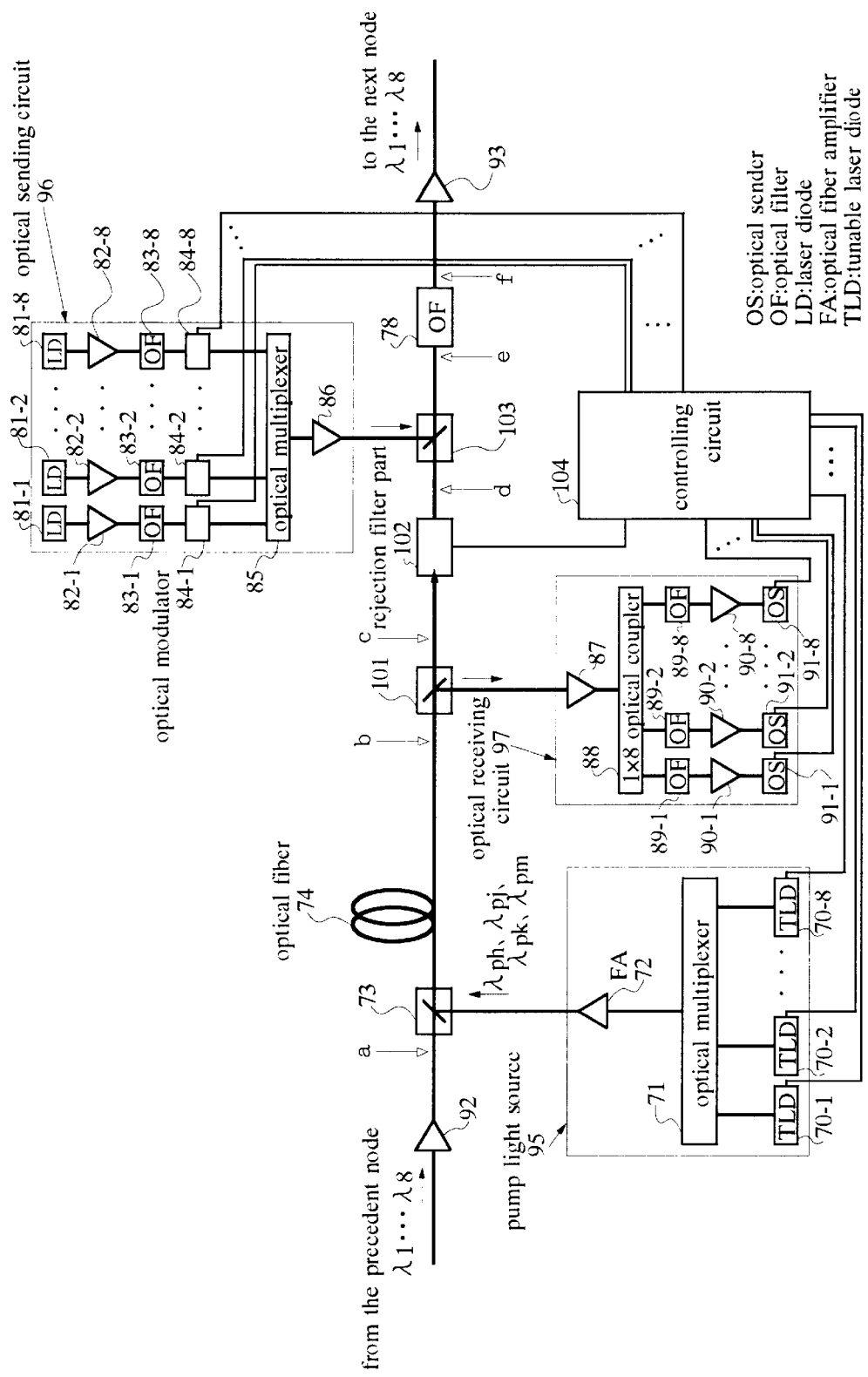
FIG. 11 is a diagram showing a construction of an OADM according to a seventh embodiment.
Figure 13:
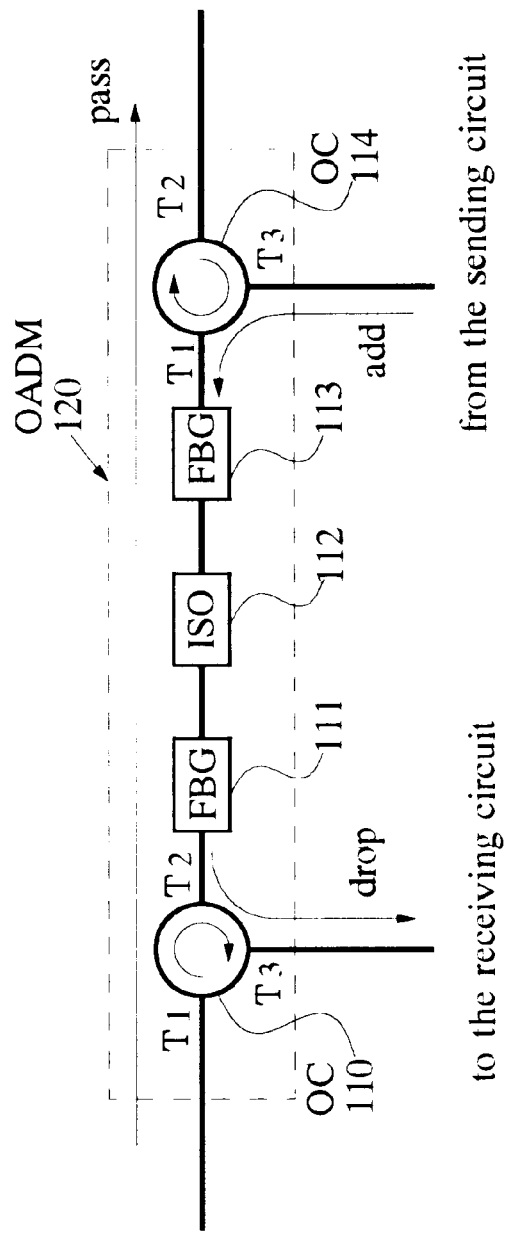
FIG. 13 is a diagram showing a construction of the OADM of the prior art.

In FIG. 11, the WDM optical signal of eight waves, as transmitted from the precedent node, are inputted into and amplified by an EDFA 92 and are then inputted into one of the entrance ports of an optical multiplexer 73.

Moreover, the laser beam outputted from the pump source 95 is also inputted into the other entrance port of the Optical multiplexer 73.

The pump light source 95 has a construction identical to that of the fifth embodiment so that its description will be omitted.

The WDM optical signal inputted into the Optical multiplexer 73 and the laser beam or the pump light are combined by the Optical multiplexer 73 and are inputted into optical fibers 74.

The optical fibers 74 have chromatic dispersion characteristics as illustrated in FIG. 10. The optical fibers 74 have the characteristics satisfying the [Eq.8] and the [Eq.9] simultaneously. The WDM optical signal is subjected by the optical fibers 74 to the four-wave mixing with the laser beam as pump light.

The pump light, the WDM optical signal and the four-wave mixing-generated WDM optical signal, as outputted from the optical fibers 74, are inputted into an optical multiplexer 101 of a dielectric multilayer optical filter.

An optical multiplexer 101 separates the four-wave mixing-generated WDM optical signal from the pump lights, the WDM optical signal and the four-wave mixing-generated WDM optical signal into optical receiving circuit 97 and is inputted to the pump lights and the WDM optical signal into a rejection filter part 102. The cut-off wavelength of the Optical multiplexer 101 may be set between the wavelength band of the pump lights and the wavelength band of the four-wave mixing-generated optical signals, because the wavelength band of the four-wave mixing-generated optical signals is calculated from the [Eq. 8] and the [Eq. 9] when the wavelength band of the WDM optical signal and the wavelength band of the pump lights are determined.

The optical receiving circuit 97 has a construction identical to that of the fifth embodiment so that its description will be omitted.

The rejection filter part 102 is a filter for filtering the optical signals, which were used for generating the four-wave mixing-generated optical signals separated at the Optical multiplexer 101, out of the WDM optical signal.

The rejection filter part 102 can be exemplified by an acousto-optic tunable filter (as will be abbreviated as the "AOTF").

This AOTF is the tunable filter for separating/selecting the incident light by the diffraction effect by the refractive index change which is induced by the acousto-optic effect. The ultrasonic waves to be used for this acousto-optic effect are exemplified by the elastic surfaces waves. The elastic surface waves are generated by applying a voltage of the RF frequency to the electrodes which are formed on a substrate exhibiting the piezoelectric action. In the use of the AOTF, by controlling the RF frequency to be applied to the AOTF by a controlling circuit 104, the WDM optical signal inputted into the rejection filter part 102 are filtered off the optical signal separated by the Optical multiplexer 101 and used for generating the four-wave mixing-generated optical signals. In order to reject the ch1 and the ch2, for example, the RF frequency for rejecting the ch1 and the RF frequency for rejecting the ch2 are applied to the AOTF.

On the other hand, the rejection filter part 102 can be constructed of FBGs prepared for the number of the chs of the WDM optical signal and switches for selecting these FBGs, for example.

Eight FBGs are prepared in this embodiment for the number of chs of the WDM optical signal, and their center transmission wavelengths are set to match each of the wavelengths of the individual chs. By means of the switches, the FBGs having the center transmission wavelengths corresponding to the wavelengths of the chs to be rejected are selected from the eight and are sequentially connected in tandem. By controlling the switches with the controlling circuit 104 of the construction, the WDM optical signal inputted into the rejection filter part 102 are filtered off the optical signals separated at the Optical multiplexer 101 and used for generating the four-wave mixing-generated optical signals, by passing the selected FBGs.

The WDM optical signal rejected of the predetermined chs and the pump lights are inputted into an optical multiplexer 103 of a dielectric multilayer optical filter. The optical signals to be added, as generated at the optical sending circuit 96, are also inputted into the Optical multiplexer 103.

The optical sending circuit 96 has a construction identical to that of the fifth embodiment so that its description will be omitted.

The Optical multiplexer 103 wavelength-multiplexes the optical signals to be added with the WDM optical signal rejected of the predetermined chs.

The WDM optical signal and the pump lights, as outputted from the Optical multiplexer 103, are inputted into the optical filter 78. This optical filter 78 is a dielectric multilayer optical filter for shading the pump lights but passing the WDM optical signal.

Here in the sixth embodiment, the optical filter 78 is disposed downstream of the Optical multiplexer 103. In addition to this construction, the optical filter 78 may be interposed between the optical fibers 74 and the Optical multiplexer 101, between the Optical multiplexer 101 and the rejection filter part 102, or between the rejection filter part 102 and the Optical multiplexer 103.

The WDM optical signal outputted from the optical filter 78 are amplified by the EDFA 93 and transmitted to the next node.

The actions of the sixth embodiment will be described.

The actions of the OADM thus constructed will be described on the case in which the ch3, the ch5 and the ch6 are to be dropped/added from the WDM optical signal of eight waves, for example.

In the sixth embodiment, the controlling circuit 104 selects the TLDs 70 of a number equal to that of the chs to be dropped/added, from the eight TLDs 70. In this example, the ch3, the ch5 and the ch6 are dropped/added so that the three TLDs 70 such as the TLDs 70-1 to 70-3 are selected. Moreover, the controlling circuit 104 controls these three TLDs 70 to oscillate the pump lights of wavelengths $\lambda p3$, $\lambda p5$ and $\lambda p6$ (or the angular frequencies $\omega p3$, $\omega p5$ and $\omega p6$) for the four-wave mixing of the ch3, the ch5 and the ch6.

Here, since the individual pump lights having oscillated are combined by the Optical multiplexer 71, it is arbitrary how the individual wavelengths $\lambda p3$, $\lambda p5$ and $\lambda p6$ are assigned to the TLDs 70-1 to 70-3.

The pump lights of the angular frequencies $\omega p3$, $\omega p5$ and $\omega 6$, as combined at the Optical multiplexer 71, are amplified by the FA 72 and inputted into the Optical multiplexer 73. The gain of the FA 72 is sufficient for generating the four-wave mixing in the optical fibers 74.

The lights, as located at a in FIG. 11 and inputted from the precedent node to this node, are eight optical signals (or WDM optical signal) of angular frequencies $\omega 1$ to $\omega 8$, as illustrated in FIG. 12A. Here, the abscissa of FIG. 11 indicates the angular frequency (or wavelength).

These eight optical signals are combined at the Optical multiplexer 73 with the pump lights of the angular frequencies $\omega p3$, $\omega p5$ and $\omega p6$ and are inputted into the optical fibers 74. Moreover, the eight optical signals are subjected in the optical fibers 74 to the four-wave mixing with the pump lights of the angular frequencies $\omega p3$, $\omega p5$ and $\omega p6$ according to the [Eq. 8] and the [Eq. 9]. As a result, the lights at the exit ends of the optical fibers 74, as located at b in FIG. 11, are eight optical signals of angular frequencies $\omega 1$ to $\omega 8$, the pump lights of the angular frequencies $\omega p3$, $\omega p5$ and $\omega p6$, and five four-wave mixing-generated optical signals of the angular frequencies $\omega 3\#$, $\omega 5\#$ and $\omega 6\#$, as illustrated in FIG. 12B. Here, the four-wave mixing-generated optical signals individually contain the same information as those of the original optical signals.

Of these optical signals, the three optical signals of the angular frequencies $\omega\#3$, $\omega 5\#$ and $\omega 6\#$ are separated by the Optical multiplexer 101 and are then inputted into the optical receiving circuit 97.

At c in FIG. 11, therefore, there are the pump lights of the angular frequencies $\omega p3$, $\omega p5$ and $\omega p6$ and the WDM optical signal of the angular frequencies $\omega 1$ to $\omega 8$ as shown in FIG. 12c.

These lights are inputted into the rejection filter part 102 controlled by the controlling circuit 104 so that the optical signals of the angular frequencies $\omega 3$, $\omega 5$ and $\omega 6$ are rejected. At d in FIG. 11, therefore, the ch3, the ch5 and the ch6 are "emptied" in the WDM optical signal, as illustrated in FIG. 12D.

Moreover, the "emptied" WDM optical signal are wavelength-multiplexed at the Optical multiplexer 75 with the optical signals (of the angular frequencies $\omega 3$, $\omega 5$ and $\omega 6$) of the ch3, the ch5 and the ch6 generated at the optical sending circuit 96. At e in FIG. 11, therefore, there are the pump lights of the angular frequencies $\omega 3$, $\omega 5$ and $\omega 6$ and the WDM optical signal of the angular frequencies $\omega 1$ to $\omega 8$, as illustrated in FIG. 12E.

These pump lights and a WDM optical signal are inputted into the optical filter 78 so that the pump lights are shaded. At f in FIG. 11, therefore, there is the WDM optical signal of the angular frequencies $\omega 1$ to $\omega 8$, as illustrated in FIG. 12F.

Thus, the optical signals containing new information are added to the ch3, the ch5 and the ch6, and the WDM optical signal of the eight waves keeping the information before entrance into the node of the remaining chs are outputted to the next node.

Here in the sixth embodiment, the actions of the controlling circuit 104 on the optical sending circuit 96 and the optical receiving circuit 97 are similar to those of the fifth embodiment so that their description will be omitted.

In the embodiment thus far described, on the other hand, the number of optical signals of chs to be dropped is made coincident with the number of optical signals of chs to be added, but the latter number may be less than the former number. In this case, no optical signal is present in the grid of the ch which was not added.

Thus, in the OADM of the sixth embodiment, an arbitrary number of arbitrary of optical signals of chs can be dropped by controlling circuit 104, the pump light source 95, the optical multiplexer 73, the optical fiber 74 and the optical multiplexer 101, and an arbitrary number of arbitrary of optical signals of chs can be added by controlling circuit 104, the optical sending circuit 96, the rejecting filter 102, the optical multiplexer 103 and the optical filter 78.

Here in the fourth to sixth embodiments, the TLDs have been exemplified by the wavelength tunable Bragg reflection type semiconductor lasers, to which the invention should not be limited. For example, there may be used wavelength tunable distributed feedback semi-conductor lasers which have their oscillation wavelengths changed by controlling the element temperature. Alternatively, a plurality of semi-conductor lasers corresponding to the angular frequencies of the individual pump lights may be arranged in an array so that some of them may be selectively oscillated according to the ch to be added/dropped. Thus, it is possible to employ the light sources which can selectively supply the lights corresponding to the angular frequencies of the individual pump lights.

As the WDM optical signal, on the other hand, the fourth embodiment has used the thirty-two waves, and the fifth and sixth embodiments have used the eight waves. However, the invention should not be limited thereto but can use a WDM optical signal of an arbitrary multiplexing.

In the fourth embodiment, moreover, the WDM optical signal is shaded by the optical coupler 54, but the invention should not be limited thereto. For example, it is arbitrary to use an optical filter for filtering the wavelength band containing those of the WDM optical signal.

On the other hand, the fifth and sixth embodiments have employed the Mach-Zehnder interferometer type optical modulators as the optical modulators, but the invention should not be limited thereto. For example, there may be employed semiconductor absorption type optical modulators for turning ON/OFF the lights by the Franz-Keldysh effect at the inversely biased pn junctions.

In the fourth embodiment, moreover, the TLDs 50 supplies the pump lights to both the optical fibers 53 and the optical fibers 62. However, another TLD for supplying the pump lights to the optical fibers 62 may be provided to supply the pump lights separately. In the fifth and sixth embodiments, the pump light source 95 supplies the pump lights to both the optical fibers 74 and the optical fibers 76. However, another pump-light source for supplying the pump lights to the optical fibers 76 may be provided to supply the pump lights separately.

In the fourth to sixth embodiments, on the other hand, the Optical multiplexer is exemplified by the dielectric multilayer optical filter, but the invention should not be limited thereto. For example, there can be used another Optical multiplexer such as an arrayed waveguide grating.

In the fourth to sixth embodiments, moreover, when the optical signals are deteriorated because of a long transmission distance between the precedent node and the present node, they are preferably inputted into the optical couplers 52 and 73 after they were passed trough a dispersion compensator for compensating the chromatic dispersion. When the optical signals are possibly deteriorated because of a long transmission distance between the present node and the next node, on the other hand, they are preferably sent to the next node after they were passed through the dispersion compensator for compensating the chromatic dispersion.

In the fourth to sixth embodiments, on the other hand, it is preferable for preventing the lights from being reflected on the joints of the individual optical parts that a necessary number of optical isolators are disposed, if any, at any portion from the aforementioned processing of the WDM optical signal inputted from the precedent node to the output to the next node.

The invention is not limited to the above embodiments and various modifications may be made without departing from the spirit and scope of the invention. Any improvement may be made in part or all of the components.

What is claimed is:

1. An optical dropping apparatus comprising:

generating means for generating a second wavelength-division multiplexed signal comprising a plurality of optical signals each having a wavelength, which is different from a first wavelength-division multiplex signal, by occurring four-wave mixing between a first wavelength-division multiplexed signal, in which a plurality of optical signals of different wavelengths are multiplexed, and a pump light;

dropping means for dropping light of a predetermined wavelength; and controlling means for controlling a wavelength of said pump light, to change the wavelengths of the optical signals in the generated second wavelength-division multiplexed signal.

2. An optical dropping apparatus according to claim 1, wherein said generating means includes optical fibers having a wavelength with a chromatic dispersion which is substantially zero within the wavelength range equal to the range of wavelength of said pump light.

3. An optical dropping apparatus according to claim 1, wherein said generating means has a pump light for four-wave mixing.

4. An optical add/drop multiplexer comprising:

a generating means for generating a second wavelength-division multiplexed signal by occurring four-wave mixing between a first wavelength-division multiplexed signal, in which a plurality of optical signals of different wavelengths are multiplexed, and a pump light;

a rejecting means for rejecting said first wavelength-division multiplexed optical signal;

a dropping means for dropping an optical signal of a predetermined wavelength from said first wavelength-division multiplexed signal;

an adding means for adding an optical signal having the same wavelength as said predetermined wavelength;

an inverse generating means for generating a third wavelength-division multiplexed signal by occurring four-wave mixing between a said second wavelength-division multiplexed signal, to which said optical signal is added, and said pump light; and a controlling means for controlling the wavelength of said pump light.

5. An optical add/drop multiplexer according to claim 4, further comprising:

an optical receiving means for receiving/processing the optical signal dropped from said dropping means; and an optical sending means for generating said optical signals added by said adding means.

6. An optical dropping apparatus according to claim 4, wherein said generating means includes optical fibers having a wavelength with a chromatic dispersion which is substantially zero within the wavelength range equal to the range of wavelength of said pump light.

7. An optical add/drop multiplexer comprising:

a light source for generating a plurality of pump lights of different wavelengths;

a generating means for four-wave mixing of a first wavelength-division multiplexed (WDM) signal including a plurality of optical signals having different wavelengths with the pump lights to output the first WDM signal and a second WDM signal comprising a plurality of four-wave mixing generated signals corresponding respectively to the plurality of optical signals, each of the four-wave mixing generated signals including information of the corresponding optical signals;

a dropping means for dropping a respective optical signal of said first WDM signal;

an adding means for adding an optical signal having a wavelength of a respective four wave mixing generated signal which corresponds to the dropped respective optical signal to the second WDM signal; and an inverse generating means for four-wave mixing between said pump lights and the second WDM signal to reproduce the first WDM signal.

8. An optical add/drop multiplexer according to claim 7, further comprising:

an optical receiving means for receiving/processing the optical signal dropped from said dropping means; and an optical sending means for generating said optical signal added by said adding means.

9. An optical add/drop multiplexer comprising:

a light source for generating a plurality of pump lights of different wavelengths;

a generating means for four-wave mixing of a wavelength-division multiplexed (WDM) signal including a plurality of optical signals having different wavelengths with the pump lights to output the plurality of optical signals and a plurality of four-wave mixing generated signals corresponding respectively to the plurality of optical signals, each of the four-wave mixing generated signals including information of the corresponding optical signals;

a dropping means for dropping a respective four-wave mixing generated signal;

a rejecting means for rejecting said four-wave mixing generated signals not dropped by said dropping means; and an adding means for adding optical signals having a same wavelength as said rejected optical signals to said WDM signal.

10. An optical add/drop multiplexer according to claim 9, further comprising:

an optical receiving means for receiving/processing the four-wave mixing generated signal dropped from said dropping means; and an optical sending means for generating said optical signals added by said adding means.

11. An optical dropping apparatus comprising:

a generating means for four-wave mixing of a first wavelength-division multiplexed (WDM) signal including a plurality of optical signals having different wavelengths with a pump light to output the first WDM signal and a second WDM signal comprising a plurality of four-wave mixing generated signals corresponding respectively to the plurality of optical signals, each of the four-wave mixing generated signals including information of the corresponding optical signals;

a dropping means for dropping a respective optical signal of said first WDM signal in accordance with a wavelength of the pump light; and a controlling means for controlling a wavelength of said pump light to thereby control which of the optical signals is dropped by said dropping means.

12. An optical add/drop multiplexer comprising:

a generating means for four-wave mixing of a first wavelength-division multiplexed (WDM) signal including a plurality of optical signals having different wavelengths with a pump light to output the first WDM signal and a second WDM signal comprising a plurality of four-wave mixing generated signals corresponding respectively to the plurality of optical signals, each of the four-wave mixing generated signals including information of the corresponding optical signals;

a rejecting means for rejecting said first WDM optical signal;

a dropping means for dropping a respective optical signal of said first WDM signal in accordance with a wavelength of the pump light;

an adding means for adding an optical signal having the same wavelength as said dropped optical signal to said second WDM signal;

an inverse generating means for four-wave mixing of said second WDM signal having said added optical signal and said pump light; and a controlling means for controlling a wavelength of said pump light to thereby control which of the optical signals is dropped by said dropping means.

13. An optical add/drop multiplexer comprising:

a light source to generate a plurality of pump lights of different wavelengths;

a generating unit four-wave mixing a first wavelength-division multiplexed (WDM) signal including a plurality of optical signals having different wavelengths with the pump lights to output the first WDM signal and a second WDM signal comprising a plurality of four-wave mixing generated signals corresponding respectively to the plurality of optical signals, each of the four-wave mixing generated signals including information of the corresponding optical signals;

a dropping unit dropping a respective optical signal of said first WDM signal;

an adding unit adding an optical signal having a wavelength of a respective four wave mixing generated signal which corresponds to the dropped respective optical signal to the second WDM signal; and an inverse generating unit four-wave mixing said pump lights and the second WDM signal to reproduce the first WDM signal.

14. An optical add/drop multiplexer comprising:

a light source to generate a plurality of pump lights of different wavelengths;

a generating unit four-wave mixing a wavelength-division multiplexed (WDM) signal including a plurality of optical signals having different wavelengths with the pump lights to output the plurality of optical signals and a plurality of four-wave mixing generated signals corresponding respectively to the plurality of optical signals, each of the four-wave mixing generated signals including information of the corresponding optical signals;

a dropping unit dropping a respective four-wave mixing generated signal;

a rejecting unit rejecting said four-wave mixing generated signals not dropped by said dropping unit; and an adding unit adding optical signals having a same wavelength as said rejected optical signals to said WDM signal.

15. An optical dropping apparatus comprising:

a generating unit four-wave mixing a first wavelength-division multiplexed (WDM) signal including a plurality of optical signals having different wavelengths with a pump light to output the first WDM signal and a second WDM signal comprising a plurality of four-wave mixing generated signals corresponding respectively to the plurality of optical signals, each of the four-wave mixing generated signals including information of the corresponding optical signals;

a dropping unit dropping a respective optical signal of said first WDM signal in accordance with a wavelength of the pump light; and a controlling unit controlling a wavelength of said pump light to thereby control which of the optical signals is dropped by said dropping unit.

16. An optical add/drop multiplexer comprising:

a generating unit four-wave mixing a first wavelength-division multiplexed (WDM) signal including a plurality of optical signals having different wavelengths with a pump light to output the first WDM signal and a second WDM signal comprising a plurality of four-wave mixing generated signals corresponding respectively to the plurality of optical signals, each of the four-wave mixing generated signals including information of the corresponding optical signals;

a rejecting unit rejecting said first WDM optical signal;

a dropping unit dropping a respective optical signal of said first WDM signal in accordance with a wavelength of the pump light;

an adding unit adding an optical signal having the same wavelength as said dropped optical signal to said second WDM signal;

an inverse generating unit four-wave mixing said second WDM signal having said added optical signal and said pump light; and a controlling unit controlling a wavelength of said pump light to thereby control which of the optical signals is dropped by said dropping unit.

17. An optical add/drop multiplexer comprising:

generating a plurality of pump lights of different wavelengths;

four-wave mixing a first wavelength-division multiplexed (WDM) signal including a plurality of optical signals having different wavelengths with the pump lights to output the first WDM signal and a second WDM signal comprising a plurality of four-wave mixing generated signals corresponding respectively to the plurality of optical signals, each of the four-wave mixing generated signals including information of the corresponding optical signals;

dropping a respective optical signal of said first WDM signal;

adding an optical signal having a wavelength of a respective four wave mixing generated signal which corresponds to the dropped respective optical signal to the second WDM signal; and four-wave mixing said pump lights and the second WDM signal to reproduce the first WDM signal.

18. An optical add/drop multiplexer comprising:

generating a plurality of pump lights of different wavelengths;

four-wave mixing a wavelength-division multiplexed (WDM) signal including a plurality of optical signals having different wavelengths with the pump lights to output the plurality of optical signals and a plurality of four-wave mixing generated signals corresponding respectively to the plurality of optical signals, each of the four-wave mixing generated signals including information of the corresponding optical signals;

dropping a respective four-wave mixing generated signal;

rejecting said four-wave mixing generated signals not dropped; and adding optical signals having a same wavelength as said rejected optical signals to said WDM signal.

19. An optical dropping apparatus comprising:

four-wave mixing a first wavelength-division multiplexed (WDM) signal including a plurality of optical signals having different wavelengths with a pump light to output the first WDM signal and a second WDM signal comprising a plurality of four-wave mixing generated signals corresponding respectively to the plurality of optical signals, each of the four-wave mixing generated signals including information of the corresponding optical signals;

dropping a respective optical signal of said first WDM signal in accordance with a wavelength of the pump light; and controlling a wavelength of said pump light to thereby control which of the optical signals is dropped.

20. An optical add/drop multiplexer comprising:

four-wave mixing a first wavelength-division multiplexed (WDM) signal including a plurality of optical signals having different wavelengths with a pump light to output the first WDM signal and a second WDM signal comprising a plurality of four-wave mixing generated signals corresponding respectively to the plurality of optical signals, each of the four-wave mixing generated signals including information of the corresponding optical signals;

rejecting said first WDM optical signal;

dropping a respective optical signal of said first WDM signal in accordance with a wavelength of the pump light;

adding an optical signal having the same wavelength as said dropped optical signal to said second WDM signal;

four-wave mixing said second WDM signal having said added optical signal and said pump light; and controlling a wavelength of said pump light to thereby control which of the optical signals is dropped.

* * * * *